(12) United States Patent
Park et al.

(10) Patent No.: US 11,823,362 B2
(45) Date of Patent: Nov. 21, 2023

(54) IMAGE PROVIDING APPARATUS AND IMAGE PROVIDING METHOD THEREOF, AND DISPLAY APPARATUS AND DISPLAY METHOD THEREOF

(71) Applicant: SAMSUNG ELECTRONICS CO., LTD., Suwon-si (KR)

(72) Inventors: Pilkyu Park, Suwon-si (KR); Junghye Min, Suwon-si (KR); Kwangpyo Choi, Suwon-si (KR); Kyungah Kim, Suwon-si (KR); Tejas Nair, Suwon-si (KR); Yumi Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 400 days.

(21) Appl. No.: 17/097,320

(22) Filed: Nov. 13, 2020

(65) Prior Publication Data

US 2021/0152799 A1 May 20, 2021

(30) Foreign Application Priority Data

Nov. 15, 2019 (KR) .......................... 10-2019-0146953

(51) Int. Cl.
*G06T 5/00* (2006.01)
*H04N 9/68* (2023.01)
(Continued)

(52) U.S. Cl.
CPC ............. *G06T 5/009* (2013.01); *G06F 18/00* (2023.01); *G06N 3/02* (2013.01); *G06N 3/045* (2023.01);
(Continued)

(58) Field of Classification Search
CPC ..................... G06T 5/009; G06T 9/002; G06T 2207/20208; G06T 2207/20084;
(Continued)

(56) References Cited

U.S. PATENT DOCUMENTS 8,737,738 B2   5/2014  Wang et al.
10,218,917 B2   2/2019  Van Der Vleuten
(Continued)

FOREIGN PATENT DOCUMENTS

EP    3 051 823 A1    8/2016
EP    3 518 517 A1    7/2019
KR    10-1787788 B1   10/2017

OTHER PUBLICATIONS

Communication dated Sep. 16, 2022, issued by the European Patent Office in counterpart European Application No. 20886674.9.
(Continued)

*Primary Examiner* — Jianxun Yang
(74) *Attorney, Agent, or Firm* — Sughrue Mion, PLLC

(57) ABSTRACT

A display apparatus and a controlling method thereof are disclosed. The display apparatus includes: a memory storing one or more instructions; and a processor configured to execute the stored one or more instructions to: obtain encoded data of a first digital image and artificial intelligence (AI) meta-information indicating a specification of a deep neural network (DNN), obtain a second digital image corresponding to the first digital image by decoding the encoded data, obtain a light signal converted from the second digital image according to a previously determined electro-optical transfer function (EOTF), and obtain a display signal by processing the light signal by using an opto-optical transfer function (OOTF) and a high dynamic range (HDR) DNN set according to the AI meta-information.

15 Claims, 22 Drawing Sheets

(51) Int. Cl.
  *G06T 9/00*     (2006.01)
  *G06N 3/02*     (2006.01)
  *G06F 18/00*    (2023.01)
  *G06N 3/045*    (2023.01)
  *H04N 23/88*    (2023.01)

(52) U.S. Cl.
  CPC .............. *G06T 9/002* (2013.01); *H04N 9/68* (2013.01); *H04N 23/88* (2023.01); *G06T 2207/20208* (2013.01)

(58) Field of Classification Search
  CPC .......... G06F 18/00; G06N 3/02; G06N 3/045; G06N 3/08; H04N 9/68; H04N 23/88; H04N 21/2343; H04N 21/4402; G09G 2320/0271; G09G 2370/04; G09G 5/006; G09G 5/10; G09G 2340/12
  See application file for complete search history.

(56) References Cited

U.S. PATENT DOCUMENTS

| | | | |
|---|---|---|---|
| 10,319,085 B2 | 6/2019 | Min et al. | |
| 2016/0321540 A1 | 11/2016 | Towal | |
| 2017/0185871 A1 | 6/2017 | Zhang et al. | |
| 2018/0027262 A1* | 1/2018 | Reinhard | H04N 19/98 |
| | | | 382/166 |
| 2019/0043178 A1 | 2/2019 | Chen et al. | |
| 2019/0075301 A1* | 3/2019 | Chou | H04N 19/46 |
| 2020/0151509 A1* | 5/2020 | Sunkavalli | G06V 10/82 |

OTHER PUBLICATIONS

Anonymous, "High dynamic range television for production and international programme exchange," International Telecommunication Union, ITU-R, Radiocommunication Sector of ITU, Report ITU-R BT.2390-0, BT Series, Broadcasting service (television), 2016, XP055383019, Total 40 pages.

Yi Liu et al., "A Multi-modeling Electro-Optical Transfer Function for Display and Transmission of High Dynamic Range Content", IEEE Transactions on Consumer Electronics, Nov. 2017, vol. 63, No. 4, pp. 350-358 (10 pages total).

International Search Report (PCT/ISA/210) and Written Opinion (PCT/ISA/237) issued by the International Searching Authority in International Application No. PCT/KR2020/015896, dated Feb. 18, 2021.

"Opto-Electrical/Electro-Optical Transfer Technology for HDR Signal and Standardization Trend Thereof", Jan. 2016, pp. 41-50, 11 pages total.

* cited by examiner

FIG. 8

| DISPLAY TYPE | DNN | STRUCTURE |
|---|---|---|
| A | K1 | 4 layers, 20 filter kernels |
| A | K2 | 2 layers, 6 filter kernels |
| B | L1 | 6 layers, 16 filter kernels |
| B | L2 | 3 layers, 8 filter kernels |
| C | M1 | 5 layers, 15 filter kernels |
| C | M2 | 3 layers, 8 filter kernels |

FIG. 13

| | Descriptor |
|---|---|
| AI_HDR_meta ( payloadSize ) { | |
|   AI_HDR_DNN_flag — 1301 | u(8) |
|   if (AI_HDR_DNN_flag) { | |
|     AI_HDR_num_layers — 1303 | u(8) |
|     for(i = 0; i< AI_HDR_num_layers; i++) { | |
|       AI_HDR_in_channel[ i ] — 1304 | u(8) |
|       AI_HDR_out_channel[ i ] — 1305 | u(8) |
|       AI_HDR_filter_width[ i ] — 1306 | u(8) |
|       AI_HDR_filter_height[ i ] — 1307 | u(8) |
|       for(j = 0; j < AI_HDR_filter_out_channel [ i ]; j++) { | |
|         AI_HDR_bias[ i ][ j ] — 1308 | ue(v) |
|         for(k = 0; k < AI_HDR_filter_in_channel [ i ][ j ]; k++) { | |
|           for(l = 0; l< AI_HDR_filter_width[ i ] * AI_HDR_filter_height[ i ]; l++) { | |
|             AI_HDR_weight[ i ][ j ][ k ][l] — 1309 | ue(v) |
|           } | |
|         } | |
|       } | |
|     } | |
|   } | |
| } | |

IMAGE PROVIDING APPARATUS AND IMAGE PROVIDING METHOD THEREOF, AND DISPLAY APPARATUS AND DISPLAY METHOD THEREOF

CROSS-REFERENCE TO RELATED APPLICATION(S)

This application is based on and claims priority under 35 U.S.C. § 119 to Korean Patent Application No. 10-2019-0146953, filed on Nov. 15, 2019, in the Korean Intellectual Property Office, the disclosure of which is incorporated by reference herein in its entirety.

BACKGROUND

1. Field

The disclosure relates to an image processing field and, more particularly, to a high dynamic range (HDR) for improving quality of an image to be displayed.

2. Description of Related Art

A range of brightness identifiable to a human being is approximately $10^{-6}$ nits to $10^8$ nits, but a range of brightness that human beings encounter in real life is much greater than this identifiable range. To maximize the reality of a video, various research and related art standardizations for providing a high dynamic range (HDR) greater than a dynamic range supported by a high-definition television (HDTV) have been conducted.

When it is assumed that the minimum expressible brightness is 0.0 and the maximum expressible brightness is 1.0, existing display devices use an 8-bit fixed-point value to express a brightness level of each channel. In the HDR, when a brightness level is expressed, a greater or smaller brightness value may be minutely expressed by using floating-point data of 16 bits, 32 bits, or 64 bits. In an HDR image, bright objects appear bright, dark objects appear dark, and both the bright and dark objects may be viewed in detail.

A bright range of a light signal having a linear bright value may be greater than a bright range implementable by a display apparatus, and thus, a tone mapping curve for tone mapping of the light signal is used. In the related art, because a tone mapping curve is uniformly applied to a light signal regardless of context of the light signal, quality improvement of an image to be displayed is limited.

SUMMARY

Provided are an image providing apparatus and an image providing method thereof, and a display apparatus and a display method thereof that improve, through artificial intelligence (AI)-based tone mapping, quality of an image to be displayed.

Additional aspects will be set forth in part in the description which follows and, in part, will be apparent from the description, or may be learned by practice of the presented embodiments.

In accordance with an aspect of the disclosure, a display apparatus includes: a memory storing one or more instructions; and a processor configured to execute the stored one or more instructions to: obtain encoded data of a first digital image and artificial intelligence (AI) meta-information indicating a specification of a deep neural network (DNN), obtain a second digital image corresponding to the first digital image by decoding the encoded data, obtain a light signal converted from the second digital image according to a predetermined electro-optical transfer function (EOTF), and obtain a display signal by processing the light signal by using an opto-optical transfer function (OOTF) and a high dynamic range (HDR) DNN set according to the AI meta-information.

The HDR DNN may include a plurality of layers, and the AI meta-information may include at least one of a number of layers, a type of the layers, a number of filter kernels used in at least one layer, a size of the filter kernel used in the at least one layer, a weight of the filter kernel used in the at least one layer, or a bias value.

The processor may be further configured to execute the one or more instructions to convert the light signal according to the OOFT, input the light signal to the HDR DNN, and obtain the display signal by adding the signal converted from the light signal according to the OOFT and an output signal of the HDR DNN.

The processor may be further configured to execute the one or more instructions to convert the light signal according to the OOFT, input, to the HDR DNN, a first intermediate image converted from the light signal according to an opto-electrical transfer function (OETF), convert, according to the EOTF, a second intermediate image output from the HDR DNN, and obtain the display signal by adding a signal converted from the light signal according to the OOFT and a signal converted from the second intermediate image according to the EOTF.

The processor may be further configured to execute the one or more instructions to obtain the display signal by processing the light signal according to one of the OOTF and the HDR DNN and processing, according to the other one of the OOTF and the HDR DNN, a processing result of the one of the OOTF and the HDR DNN.

The processor may be further configured to execute the one or more instructions to obtain OOTF meta-information to be used for setting the OOTF and input the obtained OOTF meta-information to the HDR DNN.

The second digital image may include a plurality of frames, and the processor may be further configured to execute the one or more instructions to obtain first AI meta-information for a frame in a first group and second AI meta-information for a frame in a second group among the plurality of frames and independently set an HDR DNN for the frame in the first group, according to the first AI meta-information, and an HDR DNN for the frame in the second group, according to the second AI meta-information.

The first AI meta-information may include first identification information of frames to which the first AI meta-information is applied, and the second AI meta-information may include second identification information of frames to which the second AI meta-information is applied.

In accordance with another aspect of the disclosure, an image providing apparatus includes: a memory storing one or more instructions; and a processor configured to execute the stored one or more instructions to: determine a specification of a deep neural network (DNN) based on difference information between a ground truth signal and a result of processing, by using an opto-optical transfer function (OOTF) and the DNN, a light signal corresponding to a first digital image, encode the first digital image, and transmit, to a display apparatus, encoded data of the first digital image and artificial intelligence (AI) meta-information indicating the determined specification of the DNN.

The ground truth signal may be predetermined based on a signal converted from the light signal according to the OOTF.

The first digital image may include a plurality of frames, and the processor may be further configured to execute the one or more instructions to independently determine a first specification of a DNN for a frame in a first group and a second specification of a DNN for a frame in a second group among the plurality of frames.

The processor may be further configured to execute the one or more instructions to divide the plurality of frames into frames in the first group and frames in the second group based on a histogram similarity or a variance of pixel values of each of the plurality of frames.

The processor may be further configured to execute the one or more instructions to determine a representative frame in the first group and a representative frame in the second group among the plurality of frames, determine the first specification of the DNN based on difference information between the ground truth signal and a result of processing, by using the OOTF and the DNN, a light signal corresponding to the representative frame in the first group, and determine the second specification of the DNN based on difference information between the ground truth signal and a result of processing, by using the OOTF and the DNN, a light signal corresponding to the representative frame in the second group.

The processor may be further configured to execute the stored one or more instructions to transmit, to the display apparatus, information indicating whether DNN-based tone mapping processing is necessary, according to a value of brightness that the display apparatus is able to display.

The processor may be further configured to execute the one or more instructions to transmit, to the display apparatus, information indicating that the DNN-based tone mapping processing is not necessary, based on a difference between a maximum value of the brightness that the display apparatus is able to display and a threshold brightness value being less than or equal to a predetermined value.

The processor may be further configured to execute the one or more instructions to receive performance information from the display apparatus, determine one of specifications of a plurality of DNNs usable for tone mapping of the light signal corresponding to the first digital image based on the received performance information, and transmit AI meta-information indicating the determined one specification of the DNN to the display apparatus.

The processor may be further configured to execute the one or more instructions to determine restrictive conditions of the DNN based on pixel values of the first digital image, and the restrictive conditions may include at least one of a minimum number of layers included in the DNN, a minimum size of a filter kernel used in at least one layer, or a minimum number of filter kernels used in the at least one layer.

In accordance with another aspect of the disclosure, an image display method includes: obtaining encoded data of a first digital image and artificial intelligence (AI) meta-information indicating a specification of a deep neural network (DNN); obtaining a second digital image corresponding to the first digital image by decoding the encoded data; obtaining a light signal converted from the second digital image according to a predetermined electro-optical transfer function (EOTF); and obtaining a display signal by processing the light signal by using an opto-optical transfer function (OOTF) and a high dynamic range (HDR) DNN set according to the AI meta-information.

In accordance with another aspect of the disclosure, an image providing method includes: determining a specification of a deep neural network (DNN) based on difference information between a ground truth signal and a result of processing, by using an opto-optical transfer function (OOTF) and the DNN, a light signal corresponding to a first digital image; encoding the first digital image; and transmitting, to a display apparatus, encoded data of the first digital image and artificial intelligence (AI) meta-information indicating the specification of the DNN.

In accordance with another aspect of the disclosure, a method of providing meta-information includes: determining a specification of a deep neural network (DNN) based on difference information between a ground truth signal and a result of processing, by using an opto-optical transfer function (OOTF) and the DNN, a light signal corresponding to a first digital image; and transmitting, to a display apparatus, artificial intelligence (AI) meta-information indicating the determined specification of the DNN.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a table indicating DNNs of various specifications determined by an image providing apparatus;

FIG. 13 illustrates a structure of AI meta-information included in the AI display data shown in FIG. 12;

DETAILED DESCRIPTION

Figure 1:
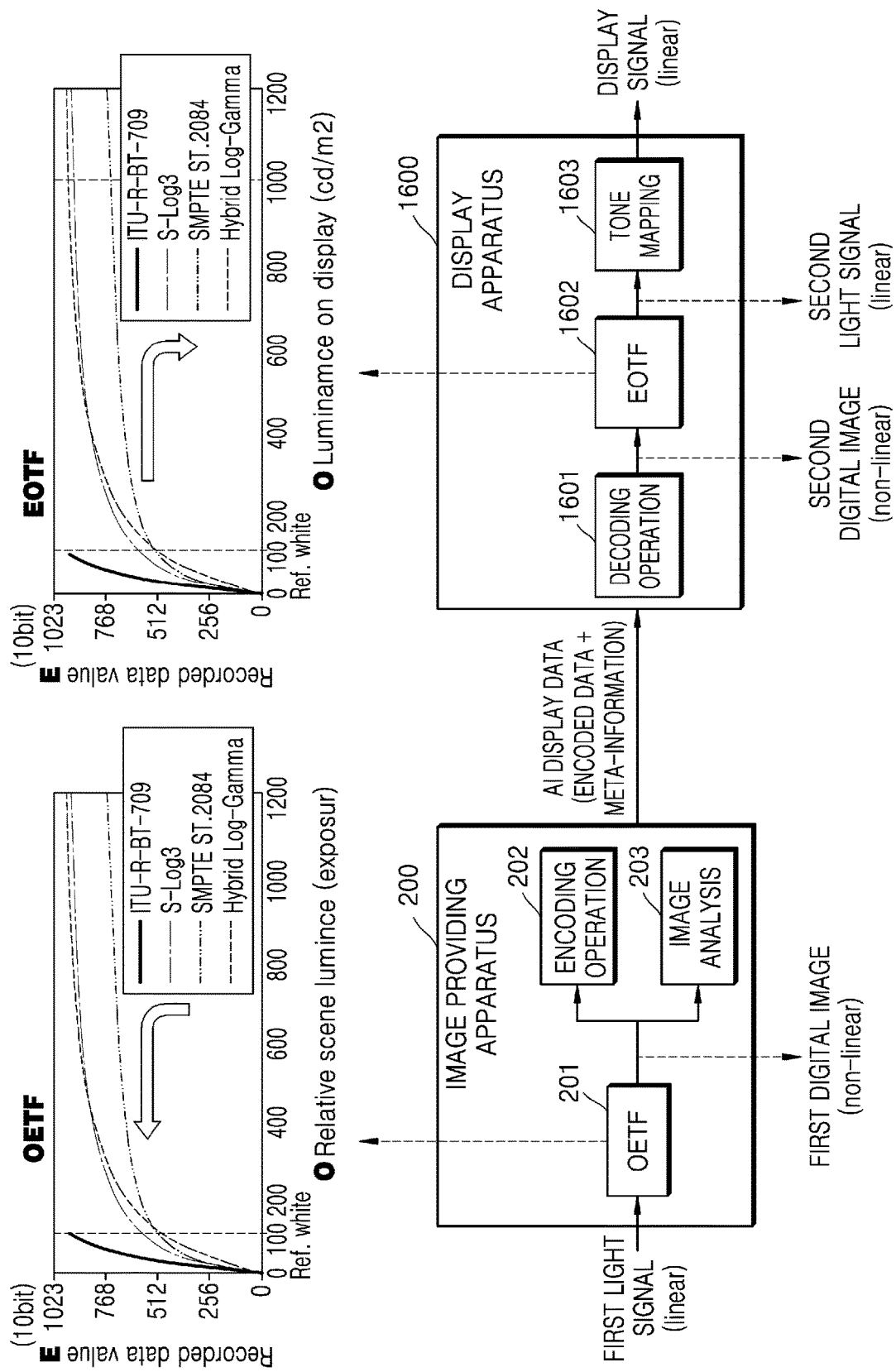
FIG. 1 illustrates an image providing method and a display method, according to an embodiment.

Various types of change or modifications may be made to disclosed embodiments, and the specific embodiments illustrated in drawings and described in detail below. However, it should be understood that the specific embodiments do not limit the disclosure to a specific form but include every modified, equivalent, or replaced form within the spirit and technical scope of the disclosure.

In the description of embodiments, where a specific description of relevant well-known features may obscure the essentials of the disclosure, a detailed description thereof may be omitted. In addition, the numbers (e.g., first and second) used in a description of an embodiment are only identification symbols to differentiate an element from another element.

When it is described that one component is "connected" or "linked" to another component, it should be understood that the one component may be directly connected to another component or may be connected or linked to another component via a third element therebetween unless there is a particularly opposite description thereto even though the direct connection is possible.

In addition, with respect to components such as " . . . unit" and " . . . module" used in the specification, two or more components may be combined into a single component, or a single component may be divided into two or more components according to subdivided functions. In addition, each of components to be described below may additionally perform a portion or all of a function of which another component is configured to perform besides a main function thereof, and a portion of a main function of which each component is configured to perform may be exclusively performed by another component.

Throughout the disclosure, expressions such as "at least one of a, b [and/or] c" indicates only a, only b, only c, both a and b, both a and c, both b and c, all of a, b, and c, or variations thereof.

In addition, in the specification, the term "light signal" indicates a signal having linear brightness values. The linear brightness values may exist two-dimensionally, i.e., in a horizontal direction and a vertical direction. A brightness value of "light signal" may be represented by a floating point. "Light signal" may include scene light collected by a camera sensor or display light output from a display. Because "light signal" corresponds to light existing in a natural condition, "light signal" has linear brightness values.

In addition, in the specification, the term "display signal" indicates a signal to be displayed, which is tone-mapped from "light signal" based on artificial intelligence (AI) and/or opto-optical transfer function (OOTF). "Display signal" may be referred to as display light. "Display signal" is represented as an image through a display.

In addition, in the specification, the term "digital image" indicates data having nonlinear brightness values. The nonlinear brightness values exist two-dimensionally, i.e., in the horizontal direction and the vertical direction. A brightness value of "digital image" may be represented by a fixed point. In the specification, a brightness value of "digital image" may be referred to as a pixel value. Because "digital image" is converted from a light signal according to visual characteristics of the human being, "digital image" has nonlinear brightness values unlike light existing in a natural condition.

In addition, "light signal," "display signal," and "digital image" may include at least one frame. Herein, "frame" includes brightness values of one time point among brightness values over time.

In addition, brightness values of "light signal," "display signal," and "digital image" may be represented as RGB values or luminance values.

In addition, in the specification, the term "opto-electrical transfer function" (OETF) is a function of defining a relation between brightness values of a light signal and brightness values of a digital image. A digital image may be obtained by converting brightness values of a light signal according to the OETF. The OETF may convert brightness values having a relatively small size, which are included in a narrow range among brightness values of a light signal, into brightness values of a wide range and convert brightness values having a relatively large size, which are included in the wide range among the brightness values of the light signal, into brightness values of the narrow range. The OETF may convert a light signal into a digital image suitable for a cognitive visual characteristic of the human being, thereby enabling optimal bits to be allocated in quantization of the digital image. That is, in a digital image converted from a light signal according to the OETF, a greater number of bits may be allocated to a region corresponding to a dark area of the light signal, and a lower number of bits may be allocated to a region corresponding to a bright area of the light signal.

In addition, in the specification, the term "electro-optical transfer function" (EOTF) is a function of defining a relation between brightness values of a digital image and brightness values of a light signal and may have an inverse relation with the OETF. A light signal may be obtained by converting brightness values of a digital image according to the EOTF.

In addition, in the specification, the term "opto-optical transfer function" (OOTF) is a function of defining a relation between brightness values of any one light signal and brightness values of another light signal. Another light signal may be obtained by converting brightness values of any one light signal according to the OOTF.

In addition, in the specification, the term "tone mapping" indicates an operation of converting a light signal into a display signal according to the OOTF and/or AI.

In addition, in the specification, the term "deep neural network" (DNN) is a representative example of artificial neural network models simulating cerebral nerves and is not limited to an artificial neural network model using a particular algorithm.

In addition, in the specification, the term "structure of a DNN" indicates at least one of the number of layers constituting the DNN, a type of the layers, a size of a filter kernel used in at least one layer, or the number of filter kernels used in the at least one layer.

In addition, in the specification, the term "parameter of a DNN" is a value used in a computation operation of each layer constituting the DNN and may include at least one of, for example, a weight to be used when an input value is applied to a certain formula or a bias value to be added to or subtracted from a result value of the certain formula. "Parameter" may be represented in a matrix form. Further, "parameter" is a value optimized as a result of training and may be updated through separate training data in accordance with circumstances. "Parameter" may be determined through a training operation of a DNN using training data after a structure of the DNN is determined.

In addition, in the specification, the term "specification of a DNN" indicates at least one of a structure or a parameter of the DNN. For example, in the specification, the expression "determining a specification of a DNN" indicates determining a structure of the DNN, determining a parameter of the DNN, or determining the structure and the parameter of the DNN.

In addition, in the specification, the term "high dynamic range (HDR) DNN" is a DNN to be used for tone mapping of a light signal and is set to have a specification of a DNN determined through one or more embodiments described below.

In addition, in the specification, the term "setting an HDR DNN (or an OOTF)" may indicate storing an HDR DNN (or OOTF) having a specification indicated by AI meta-information (or OOTF meta-information), modifying a previously stored HDR DNN (or OOTF) having an arbitrary specification such that the previously stored HDR DNN (or OOTF) has a specification indicated by AI meta-information (or OOTF meta-information), or generating an HDR DNN (or OOTF) having a specification indicated by AI meta-information (or OOTF meta-information). In other words, the term "setting an HDR DNN (or an OOTF)" may indicate various types of operations enabling a display apparatus to use an HDR DNN (or OOTF) having a specification indicated by AI meta-information (or OOTF meta-information).

Hereinafter, embodiments will be described in detail.

FIG. 1 illustrates an image providing method and a display method according to an embodiment.

Referring to FIG. 1, a first digital image having nonlinear brightness values is obtained by applying an OETF 201 to a first light signal having linear brightness values. AI though FIG. 1 shows that an image providing apparatus 200 converts the first light signal according to the OETF 201, application of the OETF 201 may be achieved by a camera sensor, and in this case, the image providing apparatus 200 obtains the first digital image generated as an application result of the OETF 201.

The image providing apparatus 200 performs an encoding operation 202 and image analysis 203 on the first digital image and transmits, as a result of the encoding operation 202 and the image analysis 203, AI display data including encoded data and meta-information to a display apparatus 1600. The meta-information includes information to be used in tone mapping 1603 by the display apparatus 1600.

According to an embodiment, the tone mapping 1603 uses an OOTF and an HDR DNN, and the image providing apparatus 200 transmits, to the display apparatus 1600, OOTF meta-information by which the display apparatus 1600 sets the OOTF and transmits, to the display apparatus 1600, the AI meta-information by which the display apparatus 1600 sets the HDR DNN. Because the meta-information is derived as an analysis result of the first digital image, the display apparatus 1600 may display an image of excellent quality through the tone mapping 1603 based on the meta-information.

The encoding operation 202 of the image providing apparatus 200 may include: generating prediction data by predicting the first digital image; generating residual data corresponding to a difference between the first digital image and the prediction data; transforming the residual data of a spatial domain component into the residual data of a frequency domain component; quantizing the residual data transformed into the frequency domain component; entropy-encoding the quantized residual data; and the like. The encoding operation 202 may be implemented through one of image compression schemes using frequency transform, such as Moving Picture Experts Group 2 (MPEG-2), H.264 Advanced Video Coding (AVC), MPEG-4, High Efficiency Video Coding (HEVC), VC-1, VP8, VP9, AOMedia Video 1 (AV1), etc.

The encoded data may be transmitted in a bitstream form. The encoded data may include data obtained based on pixel values of the first digital image, e.g., the residual data corresponding to the difference between the first digital image and the prediction data. In addition, the encoded data includes a plurality of pieces of information used in an encoding operation of the first digital image. For example, the encoded data may include prediction mode information, motion information, quantization parameter related information, and the like used to encode the first digital image. The encoded data may be generated according to a rule, e.g., a syntax, of an image compression scheme used in the encoding operation 202 among image compression schemes using frequency transform, such as MPEG-2, H.264 AVC, MPEG-4, HEVC, VC-1, VP8, VP9, AV1, etc.

The meta-information may be transmitted in a bitstream form by being included in the encoded data. According to implementation examples, the meta-information may be transmitted in a frame or packet form by being separated from the encoded data. The encoded data and the meta-information may be transmitted over the same network or different networks. AI though FIG. 1 shows that both the meta-information and the encoded data are transmitted from the image providing apparatus 200 to the display apparatus 1600, according to implementation examples, the meta-information and the encoded data may be transmitted from different apparatuses to the display apparatus 1600, respectively.

The display apparatus 1600 that has received the AI meta-information performs a decoding operation 1601 on the encoded data to restore a second digital image having nonlinear brightness values. Herein, the decoding operation 1601 may include: generating quantized residual data by entropy-decoding the encoded data; inverse-quantizing the quantized residual data; transforming the residual data of a frequency domain component into the residual data of a spatial domain component; generating prediction data; obtaining the second digital image by using the prediction data and the residual data; and the like. The decoding operation 1601 may be implemented through an image decompression method corresponding to one of the image compression schemes using frequency transform, such as MPEG-2, H.264 AVC, MPEG-4, HEVC, VC-1, VP8, VP9, AV1, etc.

The display apparatus 1600 obtains a second light signal converted from the second digital image according to a previously determined EOTF 1602. The second light signal includes linear brightness values. The EOTF 1602 and the OETF 201 may have an inverse relation with each other.

The display apparatus 1600 obtains a display signal having linear brightness values by applying the tone mapping 1603 based on the meta-information to the second light signal. The display signal is output on a screen of the display apparatus 1600.

Because the meta-information is derived as an analysis result of the first digital image, the display apparatus 1600 may set an OOTF and an HDR DNN optimized to the first digital image, based on the meta-information, and display an image of excellent quality by performing the tone mapping 1603 based on the set OOTF and HDR DNN.

In the disclosure, the tone mapping 1603 on the second light signal is performed based on a DNN. The image providing apparatus 200 determines which specification of a DNN is used to perform the tone mapping 1603 on the second light signal so as to improve, the most, quality of an image to be displayed. In addition, the image providing apparatus 200 transmits the meta-information indicating a specification of a DNN, particularly, the AI meta-information, to the display apparatus 1600 such that the display apparatus 1600 performs the tone mapping 1603 based on the DNN. That is, by providing the AI meta-information from the image providing apparatus 200 to the display apparatus 1600, a viewer may view an image having a wide brightness range and a brightness value improved according to a context. It is understood that embodiments are not limited to the display apparatus 1600, and include image processing apparatuses that decode and process (including tone mapping) an image signal for output, e.g., to a display.

Hereinafter, a configuration and an operation of the image providing apparatus 200 and a configuration and an operation of the display apparatus 1600 are described in detail with reference to FIGS. 2 to 22.

Figure 2:
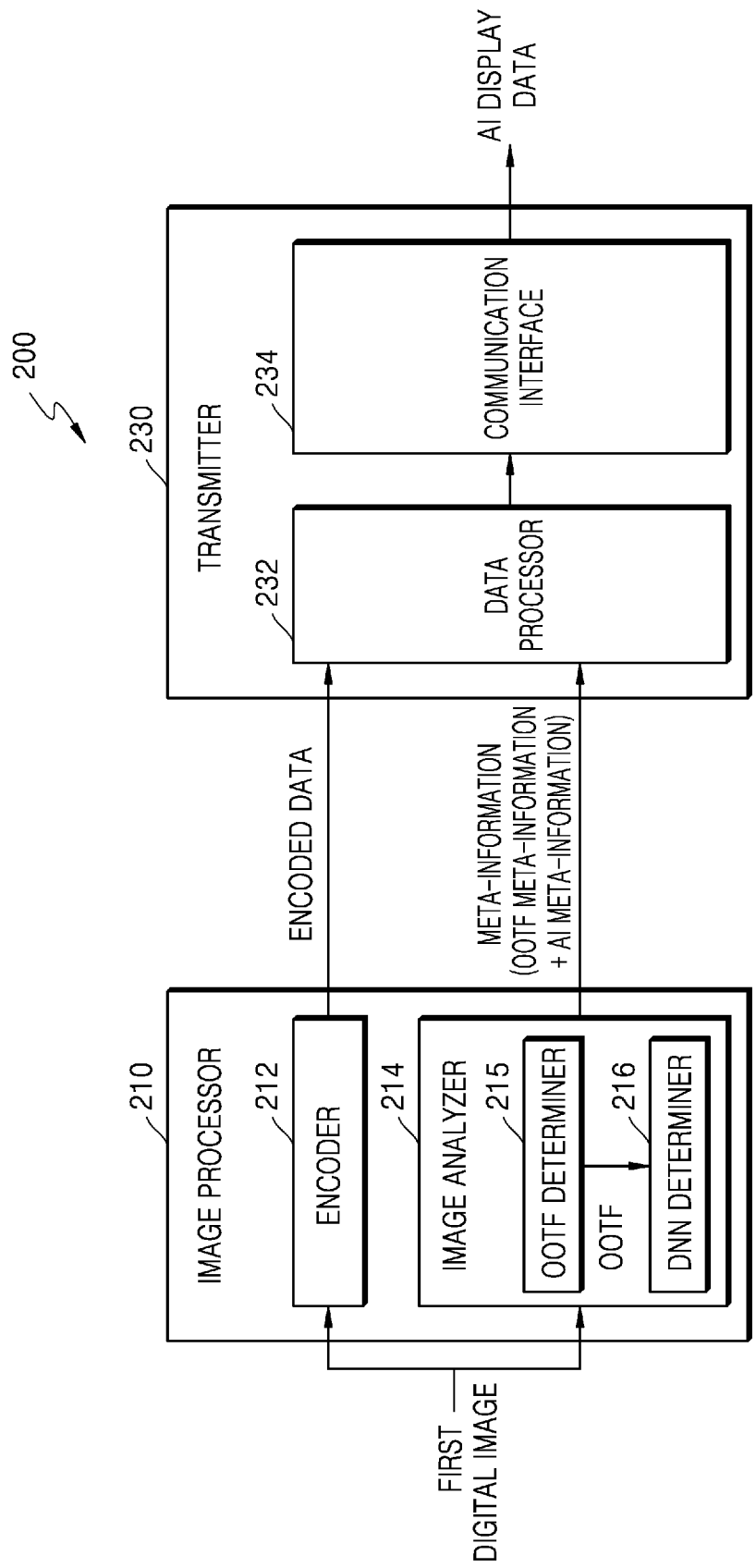
FIG. 2 is a block diagram of an image providing apparatus according to an embodiment.

FIG. 2 is a block diagram of the image providing apparatus 200 according to an embodiment.

Referring to FIG. 2, the image providing apparatus 200 according to an embodiment may include an image processor 210 and a transmitter 230. The image processor 210 may include an encoder 212 and an image analyzer 214. The transmitter 230 may include a data processor 232 and a communication interface 234.

AI though FIG. 2 shows that the image processor 210 and the transmitter 230 are separate, the image processor 210 and the transmitter 230 may be implemented by a single processor. In this case, the single processor may be implemented by an exclusive processor or by a combination of a general-purpose processor, such as an application processor (AP), a central processing unit (CPU), or a graphics processing unit (GPU), and software (S/W). In addition, the exclusive processor may be implemented with a memory for implementing an embodiment or with a memory processor for using an external memory.

In addition, the image processor 210 and the transmitter 230 may be implemented by a plurality of processors. In this case, the plurality of processors may be implemented by a combination of a plurality of general-purpose processors, such as an AP, a CPU, and a GPU, and S/W.

The encoder 212 may encode a first digital image according to a frequency transform-based image compression scheme. As a result of encoding the first digital image, encoded data is generated and transmitted to the data processor 232.

The encoded data may include data obtained based on pixel values of the first digital image, e.g., residual data corresponding to a difference between the first digital image and prediction data. In addition, the encoded data includes information used in encoding on the first digital image. For example, the encoded data may include prediction mode information, motion information, quantization parameter related information, and the like used to encode the first digital image. In addition, as described below, the encoded data may include at least one of OOTF meta-information or AI meta-information.

The image analyzer 214 may analyze the first digital image to generate meta-information for tone mapping in the display apparatus 1600. The meta-information may be transmitted to the data processor 232.

In particular, the image analyzer 214 includes an OOTF determiner 215 and a DNN determiner 216. The OOTF determiner 215 and the DNN determiner 216 determine a specification of an OOTF and a specification of a DNN, respectively, for tone mapping.

The OOTF determiner 215 may determine the specification of the OOTF by various methods. As one method, the OOTF determiner 215 may determine an OOTF having a specification corresponding to a characteristic of the first digital image among previously stored OOTFs having different specifications. Herein, the characteristic of the first digital image may include a distribution, a deviation, a variance, a histogram, and the like of the first digital image. As another method, the OOTF determiner 215 may process the first digital image or a first light signal corresponding to the first digital image by using a previously trained DNN and obtain an OOTF having a particular specification based on the processing result. As another method, the OOTF determiner 215 may obtain an OOTF having a specification determined by a manager.

When the specification of the OOTF is determined, the OOTF determiner 215 may generate OOTF meta-information. The OOTF meta-information is used for the display apparatus 1600 to set the OOTF.

Figure 3:
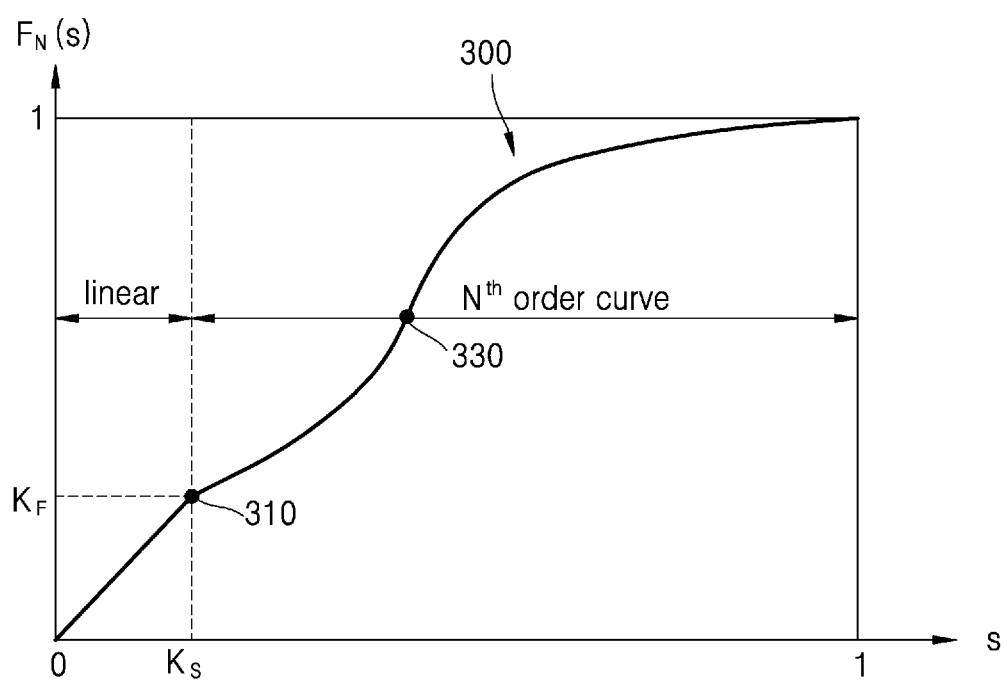
FIG. 3 is a graph illustrating an opto-optical transfer function (OOTF)

FIG. 3 is a graph illustrating an OOTF.

In FIG. 3, a horizontal axis indicates a brightness value of a light signal before tone mapping, and a vertical axis indicates a brightness value of the light signal after the tone mapping. The OOTF is used to convert a light signal having a wide brightness value range into a light signal having a relatively narrow brightness value range.

The OOTF may include a Bezier curve 300. The Bezier curve 300 includes a knee point 310 and one or more anchor points 330, wherein the Bezier curve 300 linearly changes from the origin to the knee point 310 and non-linearly changes from the knee point 310. That is, the Bezier curve 300 may include a first order graph from the origin to the knee point 310 and a multi-order graph from the knee point 310.

The anchor point 330 may indicate a point of inflection of a curve, and in the Bezier curve 300, the number of anchor points 330 may be 1 or more.

OOTF meta-information indicates a specification of the OOTF and may include at least one of information indicating a position of the knee point 310, information indicating a position of the anchor point 330, or information indicating the number of anchor points 330. Herein, the information indicating the position of the knee point 310 may include an x-axis value Ks and a y-axis value $K_F$ of the knee point 310. In addition, the information indicating the position of the anchor point 330 may include a real number value indicating the position of the anchor point 330.

Referring back to FIG. 2, the OOTF having the specification determined by the OOTF determiner 215 may be provided to the DNN determiner 216. The DNN determiner 216 determines a specification of a DNN to be used for tone mapping on a second light signal based on the first digital image and the OOTF. The DNN may include a plurality of layers, and each layer may be a convolution layer, an activation layer, a normalization layer, or a pooling layer.

Determining, by the DNN determiner 216, the specification of the DNN indicates determining a structure of the DNN and/or a parameter of the DNN. The structure of the DNN may be specified by the number of layers, a type of the layers, a size of a filter kernel used in at least one layer, and the number of filter kernels used in the at least one layer. The filter kernel may be used for convolution processing on input data in a convolution layer. In addition, the parameter of the DNN may include at least one of a weight or a bias value to be used when input data is used in a layer. For example, the parameter of the DNN may include a weight of a filter kernel to be used when input data is convolution-processed in a convolution layer. Output data may be determined through a product operation and an addition operation between weights of filter kernels and sample values of input data. A convolution operation in a convolution layer may be performed as in the related art.

The DNN determiner 216 determines a specification of a DNN for effective tone mapping on the second light signal while continuously changing the specification of the DNN.

Hereinafter, a particular method, performed by the DNN determiner 216, of determining a specification of a DNN to be used for tone mapping is described below with reference to FIGS. 4 to 7.

Figure 4:
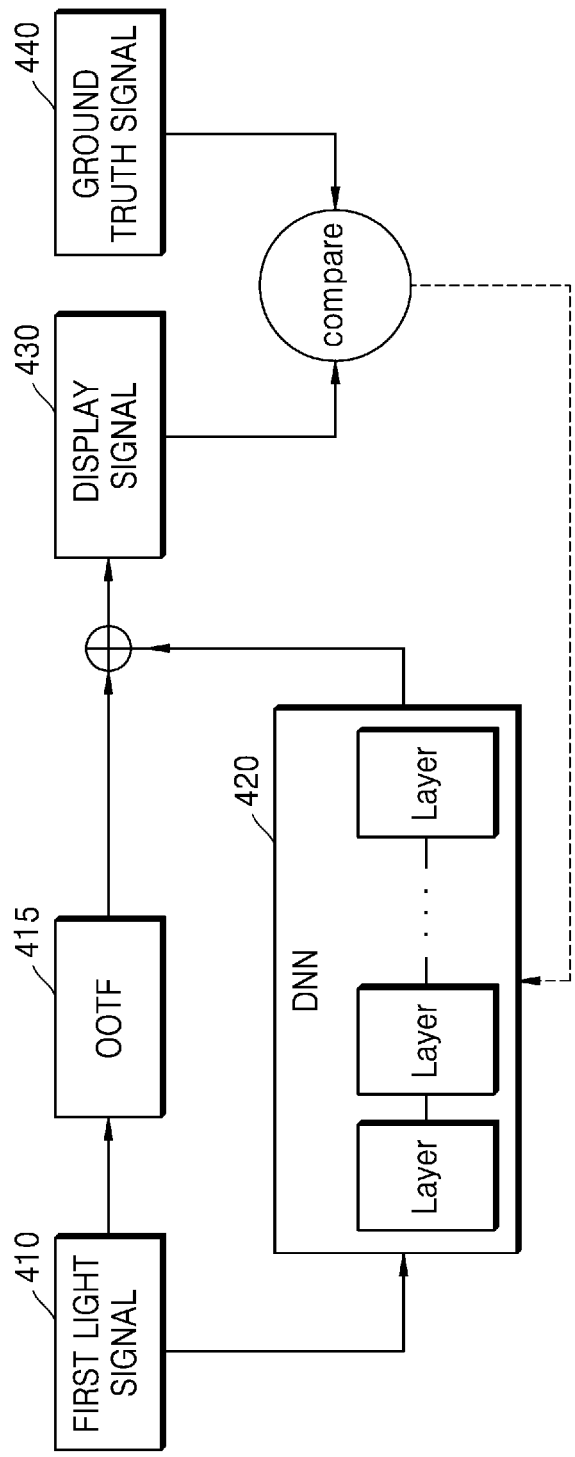
FIG. 4 illustrates a method, performed by an image providing apparatus, of determining a specification of a deep neural network (DNN), according to an embodiment.

FIG. 4 illustrates a method, performed by the image providing apparatus 200, of determining a specification of a DNN, according to an embodiment.

A first light signal 410 corresponding to a first digital image is converted according to an OOTF 415. Herein, the OOTF 415 is determined by the OOTF determiner 215.

When (or based on) the first light signal 410 corresponding to the first digital image is not stored in the image providing apparatus 200, the DNN determiner 216 converts the first digital image into the first light signal 410 according to an EOTF and converts the first light signal 410 according to the OOTF 415.

The first light signal 410 is processed by a DNN 420 of a previously determined specification. A display signal 430 is obtained by adding a processing result of the OOTF 415 and an output result of the DNN 420.

The display signal 430 is compared with a previously generated ground truth signal 440, and the specification of the DNN 420 is changed according to a difference between the display signal 430 and the ground truth signal 440. Herein, the difference between the display signal 430 and the ground truth signal 440 may be calculated as at least one of an L1-norm value, an L2-norm value, a structural similarity (SSIM) value, a peak signal-to-noise ratio-human vision system (PSNR-HVS) value, a multiscale SSIM (MS-SSIM) value, a variance inflation factor (VIF) value, or a video multimethod assessment fusion (VMAF) value.

The DNN determiner 216 may determine a difference between the display signal 430 and the ground truth signal 440 while continuously changing a specification of the DNN 420 and determine a specification of the DNN 420 capable of minimizing a corresponding difference.

According to an embodiment, the DNN determiner 216 may determine a difference between the display signal 430 and the ground truth signal 440 while continuously changing a parameter of the DNN 420 with a fixed structure of the DNN 420 and determine a parameter of the DNN 420 capable of minimizing a corresponding difference. In this case, the DNN determiner 216 may determine different parameters for various structures of the DNN 420. For example, the DNN determiner 216 may determine a parameter of the DNN 420 to minimize a difference between the display signal 430 and the ground truth signal 440 for the DNN 420 of a structure 'a' and determine a parameter of the DNN 420 to minimize a difference between the display signal 430 and the ground truth signal 440 for the DNN 420 of a structure 'b' different from the structure 'a'. Various parameters for the DNN 420 of various structures are determined to consider the performance of the display apparatus 1600 that outputs the display signal 430. This is described below with reference to FIG. 8.

The ground truth signal 440 may be generated based on a result of processing the first light signal 410 according to the OOTF 415, and for example, a manager or user may change brightness values of a signal converted from the first light signal 410 according to the OOTF 415 while monitoring the converted light signal through a display. The ground truth signal 440 may be obtained as the brightness value change result. Particularly, when (or based on) a light signal converted according to the OOTF 415 is displayed on the display, and a part having a low brightness value difficult to identify is present, the brightness value of a corresponding part may be increased to generate the ground truth signal 440 easy to generally identify.

A method of determining the ground truth signal 440 will now be described in detail. The ground truth signal 440 may be determined based on various types of displays. Because the performance of the display apparatus 1600 may vary, the ground truth signal 440 is determined by considering various types of displays. Accordingly, the ground truth signal 440 may be determined for each type of display, thereby determining a specification of the DNN 420 for each ground truth signal 440.

For example, the manager or user may change brightness values of a signal converted from the first light signal 410 according to the OOTF 415 while monitoring the converted light signal through a display 'A'. Accordingly, the ground truth signal 440 corresponding to the display 'A' is determined. In addition, the manager or user may change brightness values of a signal converted from the first light signal 410 according to the OOTF 415 while monitoring the converted light signal through a display 'B'. Accordingly, the ground truth signal 440 corresponding to the display 'B' is determined.

The DNN determiner 216 may determine a difference between the display signal 430 and the ground truth signal 440 corresponding to the display 'A' while changing a specification of the DNN 420 and determine a specification of the DNN 420 capable of minimizing a corresponding difference. In addition, the DNN determiner 216 may determine a difference between the display signal 430 and the ground truth signal 440 corresponding to the display 'B' while changing a specification of the DNN 420 and determine a specification of the DNN 420 capable of minimizing a corresponding difference.

Displays used to determine a ground truth signal may display different brightness value ranges. For example, the display 'A' may display a brightness value range of 0.001 nits to 800 nits, and the display 'B' may display a brightness value range of 0.001 nits to 1000 nits.

As described below with reference to FIG. 8, when specifications of the DNN 420 are determined for various types of displays, the DNN determiner 216 may identify the performance of the display apparatus 1600 that outputs a display signal, and transmits, to the display apparatus 1600, AI meta-information indicating a specification of the DNN 420 determined based on a display having similar performance to the identified performance.

As described above, an OOTF is used to 1:1-convert any one brightness value before tone mapping into another brightness value, but because brightness values of a light signal located in the surroundings are not considered in the 1:1 conversion, quality improvement of an image is limited. Therefore, according to an embodiment, by determining the ground truth signal 440 for optimal quality and then determining a specification of the DNN 420 capable of generating the display signal 430 similar to the ground truth signal 440, not only tone mapping of a 1:1 conversion scheme but also AI-based tone mapping considering brightness values of a light signal located in the surroundings may be performed.

Figure 5:
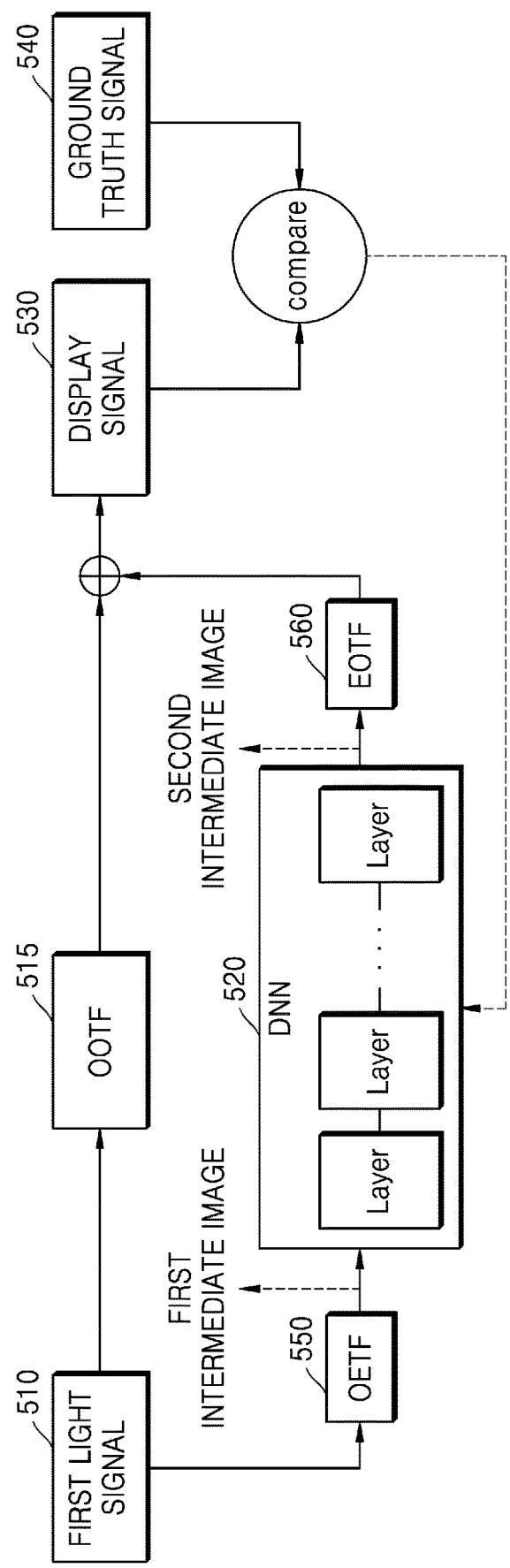
FIG. 5 illustrates a method, performed by an image providing apparatus, of determining a specification of a DNN, according to another embodiment.

FIG. 5 illustrates a method, performed by the image providing apparatus 200, of determining a specification of a DNN 520, according to another embodiment.

Referring to FIG. 5, a first light signal 510 corresponding to a first digital image is converted according to an OOTF 515. Herein, a specification of the OOTF 515 is determined by the OOTF determiner 215. When (or based on) the first light signal 510 corresponding to the first digital image is not stored in the image providing apparatus 200, the DNN determiner 216 converts the first digital image into the first light signal 510 according to an EOTF.

In addition, the first light signal 510 is converted into a first intermediate image according to an OETF 550. The first intermediate image is processed by the DNN 520 of a previously determined specification. A second intermediate image is obtained as a processing result of the DNN 520. The first intermediate image may be the first digital image, and according to implementation examples, a conversion operation by the OETF 550 may be omitted, and the first digital image may be input to the DNN 520.

The second intermediate image is converted into a light signal according to an EOTF 560, and a display signal 530 is obtained by adding a signal converted according to the EOTF 560 and a signal converted according to the OOTF 515. The display signal 530 is compared with a previously generated ground truth signal 540, and the specification of the DNN 520 is changed or determined according to a difference between the display signal 530 and the ground truth signal 540.

The DNN determiner 216 may determine a difference between the display signal 530 and the ground truth signal 540 while continuously changing a specification of the DNN 520 and determine a specification of the DNN 520 capable of minimizing a corresponding difference.

When the DNN specification determining methods shown in FIGS. 4 and 5 are compared, the first light signal 410 having linear brightness values is processed by the DNN 420 in FIG. 4, but the first intermediate image having nonlinear brightness values is processed by the DNN 520 in FIG. 5.

As described above, the ground truth signal 540 may be determined based on various types of displays, and in this case, DNNs 520 of various specifications suitable for the various types of displays may be determined. In addition, when a specification of the DNN 520 is determined, a parameter of the DNN 520 to minimize a difference between the display signal 530 and the ground truth signal 540 may be determined with a fixed structure of the DNN 520.

Figure 6:
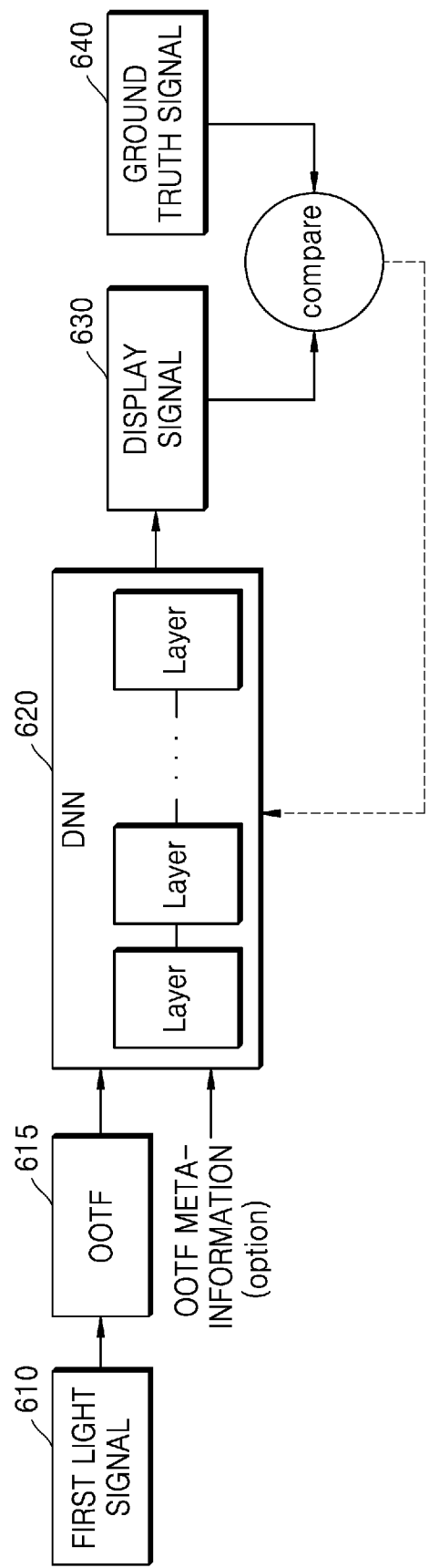
FIG. 6 illustrates a method, performed by an image providing apparatus, of determining a specification of a DNN, according to another embodiment.

FIG. 6 illustrates a method, performed by the image providing apparatus 200, of determining a specification of a DNN 620, according to another embodiment.

Referring to FIG. 6, a first light signal 610 corresponding to a first digital image is processed according to an OOTF 615, and a display signal 630 is obtained by processing the processing result by the DNN 620 of a previously determined specification. When the first light signal 610 corresponding to the first digital image is not stored in the image providing apparatus 200, the DNN determiner 216 converts the first digital image into the first light signal 610 according to an EOTF.

According to an embodiment, OOTF meta-information may also be input to the DNN 620 together with a light signal converted from the first light signal 610 according to the OOTF 615. The OOTF meta-information is determined according to a characteristic of the first digital image. Thus, when an optical signal is processed, the DNN 620 may process the optical signal according to the characteristic of the first digital image by considering the input OOTF meta-information together.

The display signal 630 is compared with a ground truth signal 640, and the specification of the DNN 620 is changed or determined according to a difference between the display signal 630 and the ground truth signal 640. The DNN determiner 216 may determine a difference between the display signal 630 and the ground truth signal 640 while continuously changing a specification of the DNN 620 and determine a specification of the DNN 620 capable of minimizing the corresponding difference.

As described above, the ground truth signal 640 may be determined based on various types of displays, and in this case, DNNs 620 of various specifications suitable for the various types of displays may be determined. In addition, when a specification of the DNN 620 is determined, a parameter of the DNN 620 to minimize a difference between the display signal 630 and the ground truth signal 640 may be determined with a fixed structure of the DNN 620.

Figure 7:
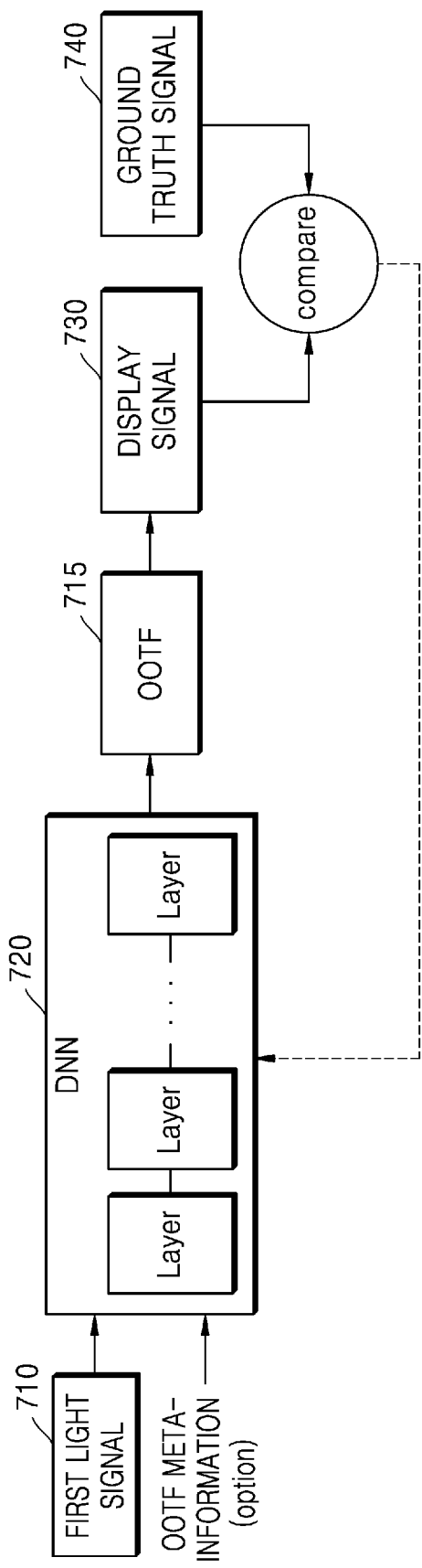
FIG. 7 illustrates a method, performed by an image providing apparatus, of determining a specification of a DNN, according to another embodiment.

FIG. 7 illustrates a method, performed by the image providing apparatus 200, of determining a specification of a DNN 720, according to another embodiment.

Referring to FIG. 7, a first light signal 710 corresponding to a first digital image is processed by the DNN 720 of a previously determined specification. Both the first light signal 710 and OOTF meta-information may be input to the DNN 720. A signal output from the DNN 720 is processed according to an OOTF 715, and a display signal 730 is obtained as the processing result. When (or based on) the first light signal 710 corresponding to the first digital image is not stored in the image providing apparatus 200, the DNN determiner 216 converts the first digital image into the first light signal 710 according to an EOTF.

The display signal 730 is compared with a ground truth signal 740, and the specification of the DNN 720 is changed or determined according to a difference between the display signal 730 and the ground truth signal 740. The DNN determiner 216 may determine a difference between the display signal 730 and the ground truth signal 740 while continuously changing a specification of the DNN 720 and determine a specification of the DNN 720 capable of minimizing the corresponding difference.

As described above, the ground truth signal 740 may be determined based on various types of displays, and in this case, DNNs 720 of various specifications suitable for the various types of displays may be determined. In addition, when (or based on) a specification of the DNN 720 is determined, a parameter of the DNN 720 to minimize a difference between the display signal 730 and the ground truth signal 740 may be determined with a fixed structure of the DNN 720.

When (or based on) a specification of a DNN is determined, the DNN determiner 216 may set a constrained condition of the DNN according to a characteristic of a first digital image checked from pixel values of the first digital image. The constrained condition of the DNN may include at least one of the minimum number of layers included in the DNN, the maximum number of layers included in the DNN, a minimum size of a filter kernel used in at least one layer, a maximum size of a filter kernel used in at least one layer, the minimum number of filter kernels used in at least one layer, or the maximum number of filter kernels used in at least one layer. The characteristic of the first digital image may be determined by a maximum brightness value, an average brightness value, a variance of brightness values, or a brightness value corresponding to a percentile of a certain value of the first digital image.

When the constrained condition is set, the DNN determiner 216 may determine a DNN of a specification by which a difference between a display signal and a ground truth signal is minimized within a range satisfying the constrained condition. In other words, when the minimum number of layers included in a DNN is determined as 3, the DNN determiner 216 may determine a specification of a DNN so as to include three or more layers, as a DNN for tone mapping.

When a range of brightness values of the first digital image is large or a distribution thereof is complicated, the DNN determiner 216 may determine at least one of the minimum number of layers included in the DNN, a minimum size of a filter kernel used in at least one layer, or the minimum number of filter kernels used in at least one layer to be larger than when the range of the brightness values of the first digital image is small or the distribution thereof is simple.

For example, the DNN determiner 216 may determine a minimum size of a filter kernel as 5×5 and the minimum number of layers as 5 when a difference between an average brightness value of the first digital image and a maximum brightness value thereof is greater than or equal to a previously determined value and determine the minimum size of the filter kernel as 3×3 and the minimum number of layers as 3 when the difference between the average brightness value of the first digital image and the maximum brightness value thereof is less than the previously determined value.

As another example, when a variance of brightness values of the first digital image is greater than or equal to a previously determined value, the DNN determiner 216 may determine the minimum size of the filter kernel as 5×5 and the minimum number of layers as 5. Otherwise, when the variance of the brightness values of the first digital image is less than the previously determined value, the DNN determiner 216 may determine the minimum size of the filter kernel as 3×3 and the minimum number of layers as 3.

As another example, when a difference between a brightness value corresponding to a percentiles (where a is a rational number) in the first digital image and the average brightness value of the first digital image is greater than or equal to a previously determined value, the DNN determiner 216 may determine the minimum size of the filter kernel as 5×5 and the minimum number of layers as 5. Otherwise, when the difference between the brightness value corresponding to the a percentiles in the first digital image and the average brightness value of the first digital image is less than the previously determined value, the DNN determiner 216 may determine the minimum size of the filter kernel as 3×3 and the minimum number of layers as 3. The brightness value corresponding to the percentiles indicates a brightness value when the number of brightness values less than the brightness value corresponding to the percentiles exists by a % of the whole brightness values.

Referring back to FIG. 2, when a specification of a DNN for tone mapping is determined, the DNN determiner 216 generates AI meta-information indicating the determined specification of the DNN. For example, the AI meta-information may include information about at least one of the number of layers, a type of the layers, the number of filter kernels used in at least one layer, a size of the filter kernel used in the at least one layer, a weight of the filter kernel used in the at least one layer, or a bias value.

When (or based on) a transmission request for the first digital image is received from the display apparatus 1600, the DNN determiner 216 transmits the AI meta-information indicating the DNN specification determined in correspondence to the first digital image to the display apparatus 1600 through the transmitter 230.

As described above, the DNN determiner 216 may determine a plurality of DNN specifications for tone mapping on a light signal corresponding to the first digital image. In this case, the DNN determiner 216 may select any one DNN specification from among the plurality of DNN specifications in response to a transmission request for the first digital image and transmit AI meta-information indicating the selected DNN specification to the transmitter 230. Herein, the plurality of DNN specifications may differ from each other. When selecting any one DNN specification from among the plurality of DNN specifications, the DNN determiner 216 may consider the performance of the display apparatus 1600 that has requested the first digital image.

FIG. 8 is a table indicating DNNs of various specifications determined by the DNN determiner 216.

As shown in FIG. 8, the DNNs of various specifications determined by the DNN determiner 216 may be classified according to types of displays used to determine the specifications of the DNNs. For example, a specification of a K1 DNN and a specification of a K2 DNN are determined based on the display 'A', wherein a structure of the K1 DNN includes four layers and 20 filter kernels, and a structure of the K2 DNN includes two layers and six filter kernels. That is, the K1 DNN and the K2 DNN are determined based on the same type of display but have different structures.

When the display apparatus 1600 requests the image providing apparatus 200 to transmit a first digital image, the display apparatus 1600 may transmit performance information of the display apparatus 1600 to the image providing apparatus 200. The performance information of the display apparatus 1600 is information from which the performance of the display apparatus 1600 is confirmed, and may include information about, for example, a manufacturer and a model of the display apparatus 1600.

When the performance of the display apparatus 1600 is confirmed, the DNN determiner 216 may select a DNN specification determined based on a display having a similar function to that of the display apparatus 1600 from among a plurality of DNN specifications and transmit AI meta-information indicating the selected DNN specification to the data processor 232. In particular, when the performance of the display apparatus 1600 corresponds to the performance of the display 'A', the DNN determiner 216 may transmit AI meta-information indicating the specification of the K1 DNN or the K2 DNN to the data processor 232. Herein, the performance of the display apparatus 1600 corresponding to the performance of the display 'A' may indicate that a range of brightness values which the display apparatus 1600 is representable is greater than or equal to a range of brightness values which the display 'A' is representable.

In addition, the DNN determiner 216 may transmit, to the data processor 232, AI meta-information indicating a specification of a DNN having a structure of the K1 DNN or the K2 DNN, which is implementable by the display apparatus 1600. A DNN including a large number of layers or using a large number of kernels may not operate in the display apparatus 1600 of low performance due to a computation load of the DNN. In this case, even though AI meta-information of a DNN including a large number of layers or using a large number of kernels is transmitted to the display apparatus 1600, the display apparatus 1600 may not implement the DNN confirmed from the AI meta-information, and thus, the display apparatus 1600 may not perform AI-based tone mapping. Therefore, the DNN determiner 216 checks the performance of the display apparatus 1600, selects a specification of a DNN operable based on the checked performance of the display apparatus 1600, and provides AI meta-information indicating the selected DNN specification to the data processor 232. Herein, the performance of the display apparatus 1600, which is checked by the DNN determiner 216, may include performance related to at least one of a computation speed and a computation amount of the display apparatus 1600, such as a processing speed of a CPU and a memory size. For example, when the display apparatus 1600 corresponding to the 'A' display may not operate a DNN including more than two layers, the DNN determiner 216 transmits AI meta-information indicating the specification of the K2 DNN to the data processor 232.

According to an embodiment, AI meta-information may include information indicating whether DNN-based tone mapping processing is necessary. The information indicating whether DNN-based tone mapping processing is necessary may include a flag. The DNN determiner 216 may determine whether the display apparatus 1600 needs to or is to perform DNN-based tone mapping, by considering the performance of the display apparatus 1600.

For example, when a difference between a maximum brightness value representable by the display apparatus 1600 and a threshold value is a certain value or more, the DNN determiner 216 may determine that DNN-based tone mapping processing is necessary. Otherwise, when the difference between the maximum brightness value representable by the display apparatus 1600 and the threshold value is less than the certain value, the DNN determiner 216 may determine that DNN-based tone mapping processing is not necessary. Herein, the threshold value may be a maximum brightness value representable by a master display used for an image analysis.

When a difference between the maximum brightness value of the master display and the maximum brightness value of the display apparatus 1600 is not large, the DNN determiner 216 may determine that DNN-based tone mapping processing is not necessary, and the display apparatus 1600 may perform only OOTF-based tone mapping processing according to AI meta-information including information indicating that DNN-based tone mapping processing is not necessary.

The reason why the maximum brightness value representable by the master display is compared with the maximum brightness value representable by the display apparatus 1600 is because the display apparatus 1600 having similar performance to that of the master display may reproduce an image of excellent quality only with OOTF-based tone mapping when a manager or user determines an OOTF having an optimal specification while viewing a light signal tone-mapped according to a preset OOTF by using the master display.

Referring back to FIG. 2, the data processor 232 obtains AI display data having a certain format by processing at least one of the encoded data or the meta-information. The AI display data obtained by the data processor 232 is described below with reference to FIGS. 10 and 12.

The communication interface 234 transmits the AI display data to the display apparatus 1600 over a network. Herein, the network may include a wired network and/or a wireless network.

According to an embodiment, the AI display data obtained as a processing result of the data processor 232 may be stored in data storage media including magnetic media such as hard disks, floppy disks, and magnetic tapes, optical recording media such as compact disc-read only memories (CD-ROMs) and digital versatile discs (DVDs), magneto-optical media such as floptical disks, and the like.

According to an embodiment, the image providing apparatus 200 may transmit only the meta-information (e.g., the AI meta-information or the AI meta-information and the OOTF meta-information), from among the meta-information and encoded image data, to the display apparatus 1600. In this case, the encoder 212 shown in FIG. 2 may be omitted from the image providing apparatus 200. The display apparatus 1600 may receive AI meta-information from the image providing apparatus 200 and receive encoded data of a first digital image from another device, e.g., a server. In addition, the display apparatus 1600 may obtain a display signal by performing AI- and OOTF-based tone mapping on a second light signal corresponding to a second digital image.

Figure 9:
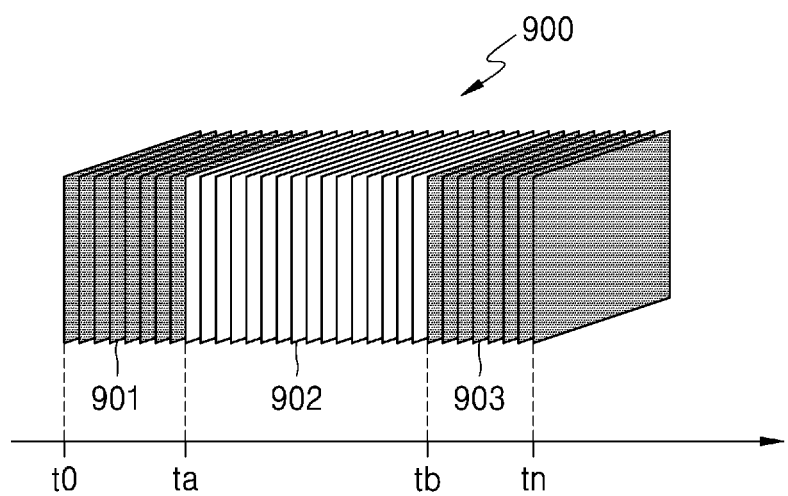
FIG. 9 illustrates frames constituting a first digital image.

FIG. 9 illustrates frames constituting a first digital image 900.

As described above, the DNN determiner 216 determines a DNN specification for tone mapping based on the first digital image 900, and as shown in FIG. 9, when the first digital image 900 includes a plurality of frames, the DNN determiner 216 may determine a DNN specification for each frame. Accordingly, a DNN specification for a first frame may differ from a DNN specification for a second frame. The DNN determiner 216 may process a first light signal corresponding to the first frame according to an OOTF and a DNN and determine a DNN specification according to a difference between a display signal obtained as the processing result and a ground truth signal. Thereafter, the DNN determiner 216 may process a first light signal corresponding to the second frame according to an OOTF and a DNN and determine a DNN specification according to a difference between a display signal obtained as the processing result and the ground truth signal.

According to an embodiment, the DNN determiner 216 may divide the frames included in the first digital image 900 into a plurality of groups and determine a DNN specification for each group. The DNN determiner 216 may divide the frames included in the first digital image 900 into a first group 901 including a frame t0 to a frame ta-1, a second group 902 including a frame ta to a frame tb-1, and a third group 903 including a frame tb to a frame tc according to characteristics of the frames. In addition, the DNN determiner 216 may select a representative frame from each of the first group 901, the second group 902, and the third group 903 and determine a DNN specification corresponding to each group for the selected representative frame. That is, the DNN determiner 216 may process a first light signal corresponding to a representative frame of the first group 901 according to an OOTF and a DNN and determine a DNN specification for the first group 901 according to a difference between a display signal obtained as the processing result and the ground truth signal. In addition, the DNN determiner 216 may process a first light signal corresponding to a representative frame of the second group 902 according to an OOTF and a DNN and determine a DNN specification for the second group 902 according to a difference between a display signal obtained as the processing result and the ground truth signal. In addition, the DNN determiner 216 may process a first light signal corresponding to a representative frame of the third group 903 according to an OOTF and a DNN and determine a DNN specification for the third group 903 according to a difference between a display signal obtained as the processing result and the ground truth signal.

The DNN determiner 216 may classify frames having similar characteristics into the same group. Whether frames have similar characteristics may be determined based on a variance of brightness values of a frame and/or a histogram similarity of the brightness values. For example, frames of which a variance or histogram similarity of brightness values belongs to a certain range may be determined as the same group.

The DNN determiner 216 may classify, into the same group, a frame in which a scene change occurs or an initial frame to a previous frame of a frame in which a next scene change occurs.

Alternatively, the DNN determiner 216 may determine a plurality of groups each including a previously determined (i.e., predetermined) number of frames consecutive over time.

Referring to FIG. 9, although the frames included in the first group 901, the second group 902, and the third group 903 are consecutive over time, the frames included in each group may not be consecutive over time. For example, the first frame, a third frame, and the like may be determined as a first group, the second frame, a fifth group, and the like may be determined as a second group, and a fourth frame, a sixth frame, and the like may be determined as a third group.

When a DNN specification is determined in a frame unit or a group unit of a first digital image, AI meta-information indicating each of the determined DNN specifications is transmitted to the display apparatus 1600 through the transmitter 230.

When pieces of AI meta-information indicating various specifications need to or are to be transmitted by determining a DNN specification in a frame unit or a group unit of a first digital image, the DNN determiner 216 may generate AI meta-information indicating a specification of a first DNN necessary or used for tone mapping. In addition, when AI meta-information indicating a specification of a DNN after the first DNN is generated, the generated AI meta-information may include difference information from a specification of a previous DNN. For example, when the first DNN includes three convolution layers, and a second DNN includes two convolution layers, the AI meta-information indicating the specification of the first DNN may include information indicating that the first DNN includes three convolution layers, and AI meta-information indicating a specification of a second DNN may include information indicating that one layer is to be omitted from the first DNN.

Hereinafter, AI display data including encoded data and meta-information is described in detail.

Figure 10:
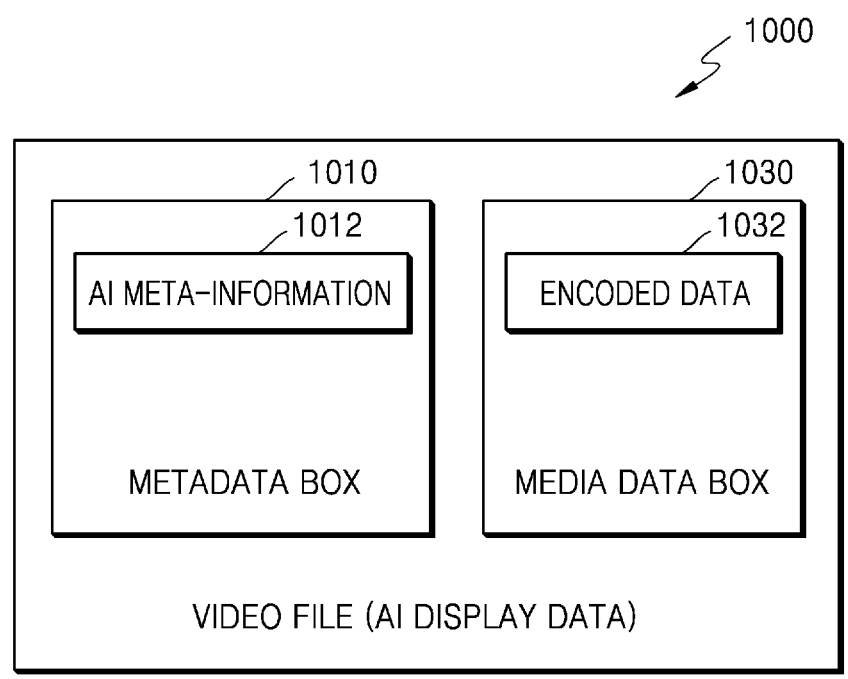
FIG. 10 illustrates artificial intelligence (AI) display data according to an embodiment.

FIG. 10 illustrates AI display data 1000 according to an embodiment.

The AI display data 1000 including a single file may include AI meta-information 1012 and encoded data 1032. Herein, the AI display data 1000 may be included in a video file of a certain container format. The certain container format may be MPEG-4 Part 14 (MP4), audio video interleaved (AVI), Matroska video (MKV), flash live video (FLV), or the like. The video file may include a metadata box 1010 and a media data box 1030.

The metadata box 1010 includes information about the encoded data 1032 included in the media data box 1030. For example, the metadata box 1010 may include information about a type of a first digital image, a type of a codec used to encode the first digital image, a play time of the first digital image, and the like. In addition, the metadata box 1010 may include the AI meta-information 1012. The AI meta-information 1012 may be encoded according to an encoding scheme provided in the certain container format and stored in the metadata box 1010. The media data box 1030 may include the encoded data 1032 generated according to a syntax of a certain image compression scheme. OOTF meta-information may be included in the metadata box 1010 together with the AI meta-information 1012 or included in the media data box 1030.

The AI meta-information 1012 may include AI meta-information for the first digital image, AI meta-information for a frame group, and AI meta-information for an individual frame. When a DNN of the same specification is determined for all frames included in the first digital image, the AI meta-information for a frame group and the AI meta-information for an individual frame may be omitted from the metadata box 1010. Alternatively, when a specification of a DNN is determined for each frame group unit of the first digital image, the AI meta-information for the first digital image and the AI meta-information for an individual frame may be omitted from the metadata box 1010.

Figure 11:
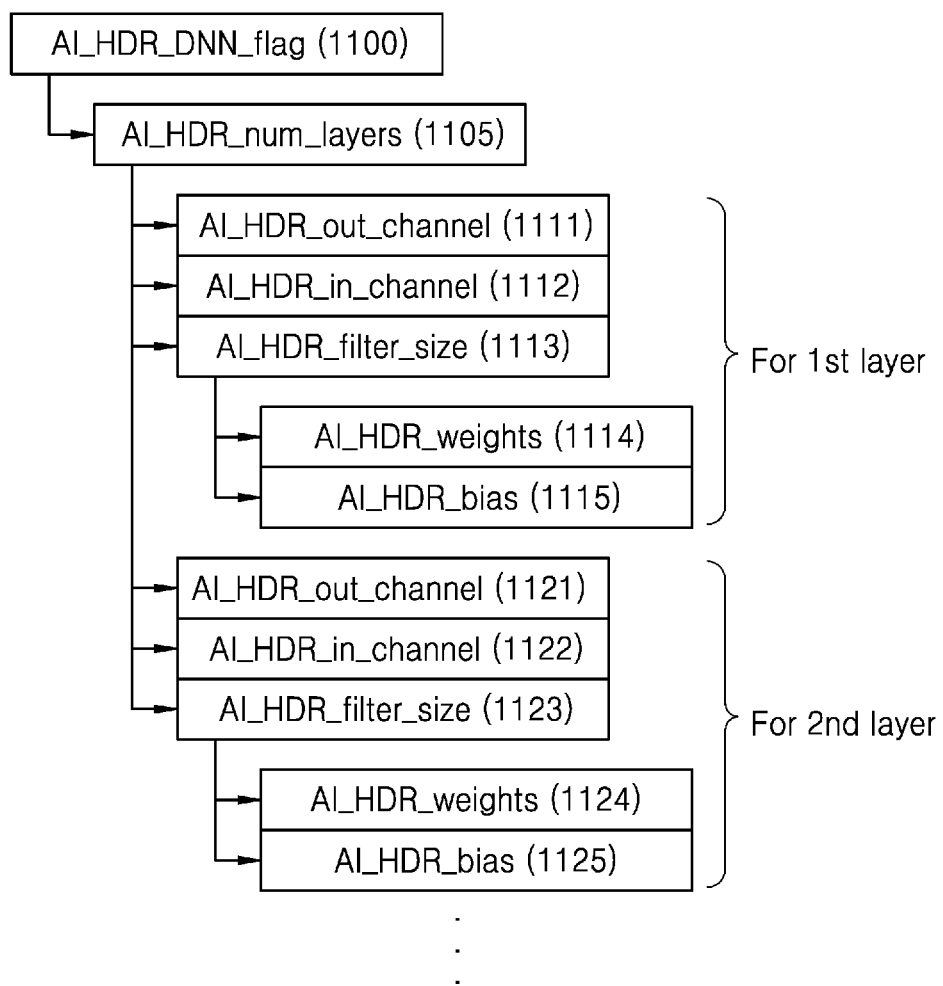
FIG. 11 illustrates a structure of AI meta-information included in the AI display data shown in FIG. 10.

FIG. 11 illustrates a structure of the AI meta-information 1012 included in the AI display data 1000 shown in FIG. 10.

In FIG. 11, AI_HDR_DNN_flag 1100 indicates whether DNN-based tone mapping processing is necessary. When the AI_HDR_DNN_flag 1100 indicates that DNN-based tone mapping processing is necessary, information such as AI_HDR_num_layers 1105, AI_HDR_out_channel 1111, AI_HDR_in_channel 1112, and AI_HDR_filter_size 1113 may be included in the AI meta-information 1012. Otherwise, when the AI_HDR_DNN_flag 1100 indicates that DNN-based tone mapping processing is not necessary, the information such as the AI_HDR_num_layers 1105, the AI_HDR_out_channel 1111, the AI_HDR_in_channel 1112, and the AI_HDR_filter_size 1113 may not be included in the AI meta-information 1012.

The AI_HDR_num_layers 1105 indicates the number of layers included in a DNN for tone mapping.

In addition, the AI_HDR_out_channel 1111, the AI_HDR_in_channel 1112, the AI_HDR_filter_size 1113, AI_HDR_weights 1114, and AI_HDR_bias 1115 indicate a specification of a first layer included in the DNN. Particularly, the AI_HDR_out_channel 1111 indicates the number of channels of data output from the first layer, and the AI_HDR_in_channel 1112 indicates the number of channels of data input to the first layer. In addition, the AI_HDR_filter_size 1113 indicates a size of a filter kernel used in the first layer, the AI_HDR_weights 1114 indicates a weight of the filter kernel used in the first layer, and the AI_HDR_bias 1115 indicates a bias value to be added to or subtracted from a result value of a certain formula in the first layer.

In addition, AI_HDR_out_channel 1121, AI_HDR_in_channel 1122, AI_HDR_filter_size 1123, AI_HDR_weights 1124, and AI_HDR_bias 1125 indicate a specification of a second layer included in the DNN. Particularly, the AI_HDR_out_channel 1121 indicates the number of channels of data output from the second layer, and the AI_HDR_in_channel 1122 indicates the number of channels of data input to the second layer. In addition, the AI_HDR_filter_size 1123 indicates a size of a filter kernel used in the second layer, the AI_HDR_weights 1124 indicates a weight of the filter kernel used in the second layer, and the AI_HDR_bias 1125 indicates a bias value to be added to or subtracted from a result value of a certain formula in the second layer.

In FIG. 11, a structure of the DNN may be determined according to the AI_HDR_num_layers 1105, the AI_HDR_out_channel 1111, the AI_HDR_out_channel 1121, the AI_HDR_in_channel 1112, the AI_HDR_in_channel 1122, the AI_HDR_filter_size 1113, and the AI_HDR_filter_size 1123, and a parameter of the DNN may be determined according to the AI_HDR_weights 1114, the AI_HDR_weights 1124, the AI_HDR_bias 1115, and the AI_HDR_bias 1125.

AI_HDR_out_channel, AI_HDR_in_channel, AI_HDR_filter_size, AI_HDR_weights, and AI_HDR_bias indicating a specification of each layer may exist by as many as the number of layers confirmed from AI_HDR_num_layers.

Figure 12:
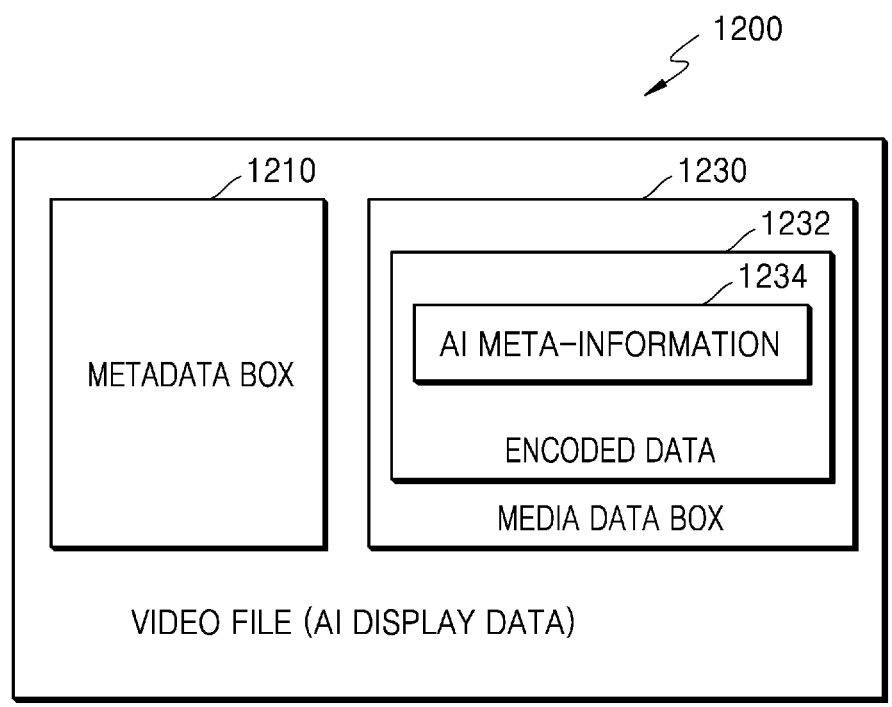
FIG. 12 illustrates AI display data according to another embodiment.

FIG. 12 illustrates AI display data 1200 according to another embodiment.

Referring to FIG. 12, AI meta-information 1234 may be included in encoded data 1232. A video file may include a metadata box 1210 and a media data box 1230, and when the AI meta-information 1234 is included in the encoded data 1232, the metadata box 1210 may not include the AI meta-information 1234. OOTF meta-information may be included in the encoded data 1232 together with the AI meta-information 1234 or included in the metadata box 1210.

The media data box 1230 may include the encoded data 1232 including the AI meta-information 1234. The AI meta-information 1234 may be encoded according to a video codec used to encode a first digital image.

Because the AI meta-information 1234 is included in the encoded data 1232, the AI meta-information 1234 may be decoded according to a decoding order of the encoded data 1232.

The encoded data 1232 includes video-unit data (e.g., a video parameter set) including information related all frames included in the first digital image, frame group-unit data (e.g., a sequence parameter set) including information related to frames included in a group, frame-unit data (e.g., a picture parameter set) including information related to an individual frame, and the like. When a DNN of the same specification is determined for all frames in the first digital image, AI meta-information may be included in the video-unit data. Alternatively, when specifications of DNNs are determined in group units, AI meta-information indicating a specification of a DNN corresponding to each group may be included in data of each frame group unit or in frame-unit data corresponding to a first frame of each group. When specifications of DNNs are determined in group units, AI meta-information corresponding to each group may include identification information (e.g., a picture order count) of frames for which corresponding AI meta-information is used. This may be useful when frames included in each group are not consecutive over time.

When specifications of DNNs are determined in frame units, AI meta-information indicating a specification of a DNN corresponding to each frame may be included in data of each frame unit.

FIG. 13 illustrates a structure of the AI meta-information 1234 included in the AI display data 1200 shown in FIG. 12, according to an embodiment.

As described above, because the encoded data 1232 is generated according to a rule, e.g., a syntax, of an image compression scheme using frequency transform, the AI meta-information 1234 may also be included in the encoded data 1232 according to the syntax.

The AI meta-information 1234 may be included in a video parameter set, a sequence parameter set, or a picture parameter set. Alternatively, the AI meta-information 1234 may be included in a supplemental enhancement information (SEI) message. The SEI message includes additional information other than information (e.g., prediction mode information, motion vector information, and the like) needed to restore a second digital image. The SEI message includes a single network abstraction layer (NAL) unit and may be transmitted in a frame group unit or a frame unit.

Referring to FIG. 13, AI_HDR_DNN_flag 1301 is included in the AI meta-information 1234. The AI_HDR_DNN_flag 1301 indicates whether DNN-based tone mapping processing is necessary (or to be performed). When the AI_HDR_DNN_flag 1301 indicates that DNN-based tone mapping processing is necessary, AI_HDR_num_layers 1303, AI_HDR_in_channel[i] 1304, AI_HDR_out_channel[i] 1305, AI_HDR_filter_width[i] 1306, AI_HDR_filter_height[i] 1307, AI_HDR_bias[i][j] 1308, and AI_HDR_weight[i][j][k][l] 1309 are included in the AI meta-information 1234.

Otherwise, when the AI_HDR_DNN_flag 1301 indicates that DNN-based tone mapping processing is not necessary (or not to be performed), the AI_HDR_num_layers 1303, the AI_HDR_in_channel[i] 1304, the AI_HDR_out_channel[ ] 1305, the AI_HDR_filter_width[i] 1306, the AI_HDR_filter_height[i] 1307, the AI_HDR_bias[i][j] 1308, and the AI_HDR_weight[i][j][k][I] 1309 are not included in the AI meta-information 1234.

The AI_HDR_num_layers 1303 indicates the number of layers included in a DNN for tone mapping. In addition, the AI_HDR_out_channel[i] 1305 indicates the number of channels of data output from an ith layer, and the AI_HDR_in_channel[i] 1304 indicates the number of channels of data input to the ith layer. In addition, the AI_HDR_filter_width[i] 1306 and the AI_HDR_filter_height[i] 1307 indicate a width and a height of a filter kernel used in the ith layer, respectively.

In addition, the AI_HDR_bias[i][j] 1308 indicates a bias value to be added to or subtracted from a result value of a certain formula for output data of a jth channel of the ith layer, and the AI_HDR_weight[i][j][k][l] 1309 indicates a weight of an Ith sample in a filter kernel associated with the output data of the jth channel of the ith layer and input data of a kth channel.

A method, performed by the display apparatus 1600, of parsing the AI meta-information 1234 shown in FIG. 13 according to an embodiment is described below.

Figure 14:
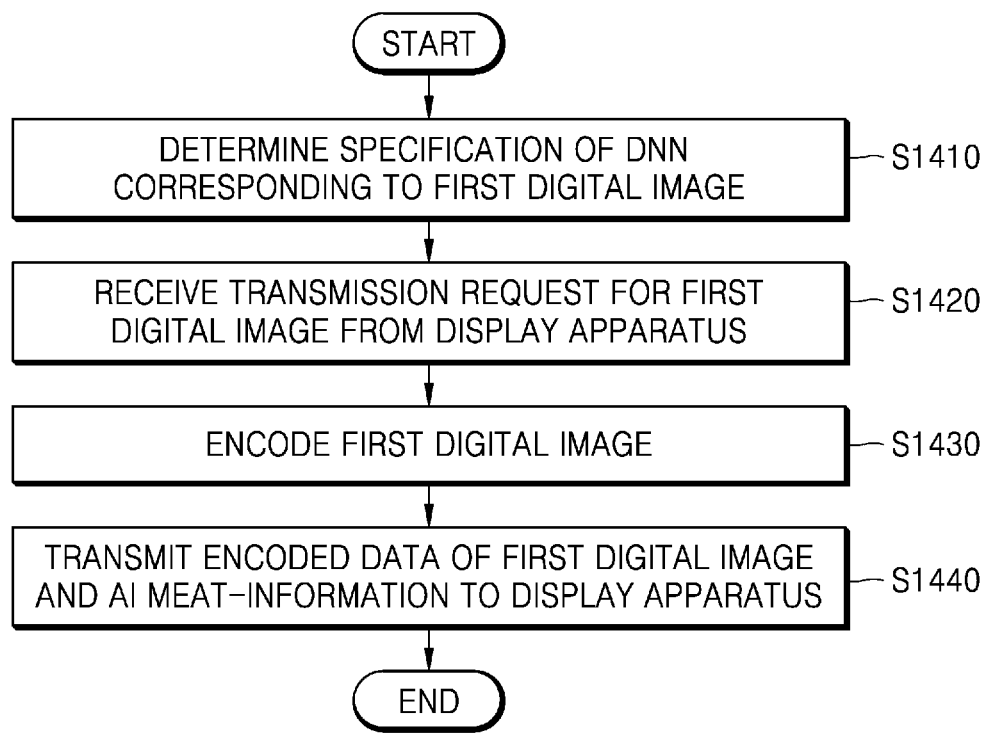
FIG. 14 is a flowchart of an image providing method according to an embodiment.

FIG. 14 is a flowchart of an image providing method according to an embodiment.

Referring to FIG. 14, in operation S1410, the image providing apparatus 200 determines a specification of a DNN corresponding to a first digital image. In particular, the image providing apparatus 200 determines a specification of a DNN to be used for tone mapping, based on a first light signal corresponding to the first digital image. As described above, when the first digital image includes a plurality of fames, the image providing apparatus 200 may determine a DNN specification for each frame or each group.

The image providing apparatus 200 may determine a specification of an OOTF corresponding to the first digital image. When the first digital image includes a plurality of fames, the image providing apparatus 200 may determine a specification of an OOTF for each frame, for each block divided from a frame, or for each group of frames. The same specification of an OOTF may be determined for all frames included in the first digital image.

In operation S1420, the image providing apparatus 200 receives a transmission request for the first digital image from the display apparatus 1600. The image providing apparatus 200 may communicate with the display apparatus 1600 through a wired/wireless network, e.g., the Internet.

In operation S1430, the image providing apparatus 200 encodes the first digital image. The image providing apparatus 200 may encode the first digital image by a frequency transform-based image compression scheme.

In operation S1440, the image providing apparatus 200 transmits, to the display apparatus 1600, encoded data of the first digital image and AI meta-information indicating the specification of the DNN determined in operation S1410. The image providing apparatus 200 may also transmit, to the display apparatus 1600, OOTF meta-information together with the encoded data and the AI meta-information.

As described above, the AI meta-information may include information indicating whether DNN-based tone mapping is necessary. When it is determined that DNN-based tone mapping is not necessary, the image providing apparatus 200 generates AI meta-information including information indicating that DNN-based tone mapping is not necessary. Otherwise, when it is determined that DNN-based tone mapping is necessary, the image providing apparatus 200 generates AI meta-information including information indicating that DNN-based tone mapping is necessary. When AI meta-information includes information indicating that DNN-based tone mapping is not necessary, information indicating the specification of the DNN determined in operation S1410 may not be included in the AI meta-information.

Figure 15:
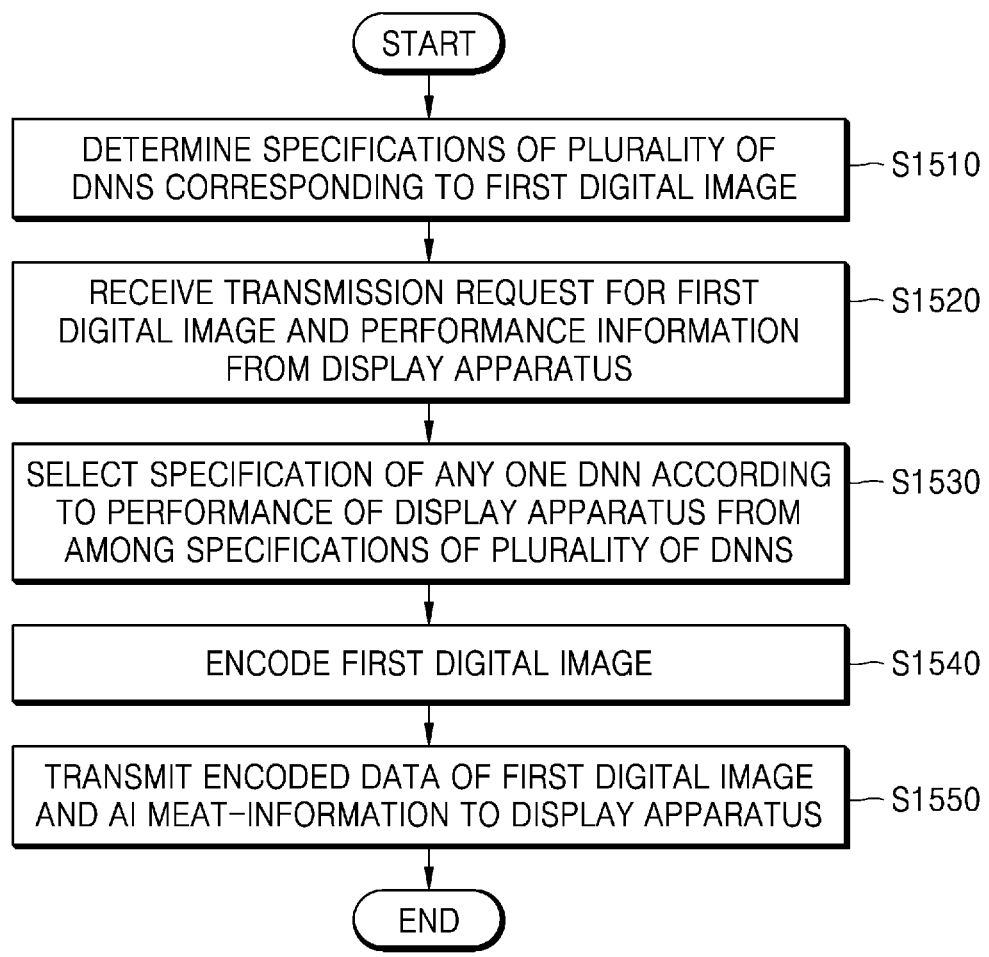
FIG. 15 is a flowchart of an image providing method according to another embodiment.

FIG. 15 is a flowchart of an image providing method according to another embodiment.

Referring to FIG. 15, in operation S1510, the image providing apparatus 200 determines specifications of a plurality of DNNs corresponding to a first digital image. The plurality of DNNs having various specifications may have different structures and/or different parameters. For example, a first DNN may include four layers, and a second DNN may include three layers. As another example, both a first DNN and a second DNN may include four convolution layers, wherein the number of filter kernels used in a convolution layer of the first DNN is 3, and the number of filter kernels used in a convolution layer of the second DNN is 4. The specifications of the plurality of DNNs may be determined based on different types of displays, respectively. That is, when a ground truth signal is determined for each of the different types of displays, various specifications of DNNs capable of generating a display signal having the least difference from the ground truth signal may be determined. Alternatively, various specifications of DNNs having different structures may be determined based on any one type of display.

When the first digital image includes a plurality of frames, the image providing apparatus 200 may determine various specifications of DNNs in frame units or group units, respectively.

The image providing apparatus 200 may determine a specification of an OOTF corresponding to the first digital image. When the first digital image includes a plurality of frames, the image providing apparatus 200 may determine a specification of an OOTF for each frame, for each block divided from a frame, or for each group. The same specification of an OOTF may be determined for all frames included in the first digital image.

In operation S1520, the image providing apparatus 200 receives, from the display apparatus 1600, a transmission request for the first digital image and performance information of the display apparatus 1600. The image providing apparatus 200 may communicate with the display apparatus 1600 through a wired/wireless network, e.g., the Internet.

The performance information of the display apparatus 1600 is information from which the performance of a display is confirmed, and may include, for example, manufacturer information and model information of the display apparatus 1600.

In operation S1530, the image providing apparatus 200 selects a DNN specification determined based on a display having similar performance to that of the display apparatus 1600 from among the specifications of the plurality of DNNs by considering the performance of the display apparatus 1600. When a plurality of DNN specifications are determined based on the display having similar performance to that of the display apparatus 1600, the image providing apparatus 200 selects a DNN specification having a structure implementable by the display apparatus 1600 from among the plurality of DNN specifications.

In operation S1540, the image providing apparatus 200 encodes the first digital image. The image providing apparatus 200 may encode the first digital image by a frequency transform-based image compression scheme.

In operation S1550, the image providing apparatus 200 transmits, to the display apparatus 1600, encoded data of the first digital image and AI meta-information indicating the specification of the DNN selected in operation S1530. The image providing apparatus 200 may also transmit, to the display apparatus 1600, OOTF meta-information together with the encoded data and the AI meta-information.

Figure 16:
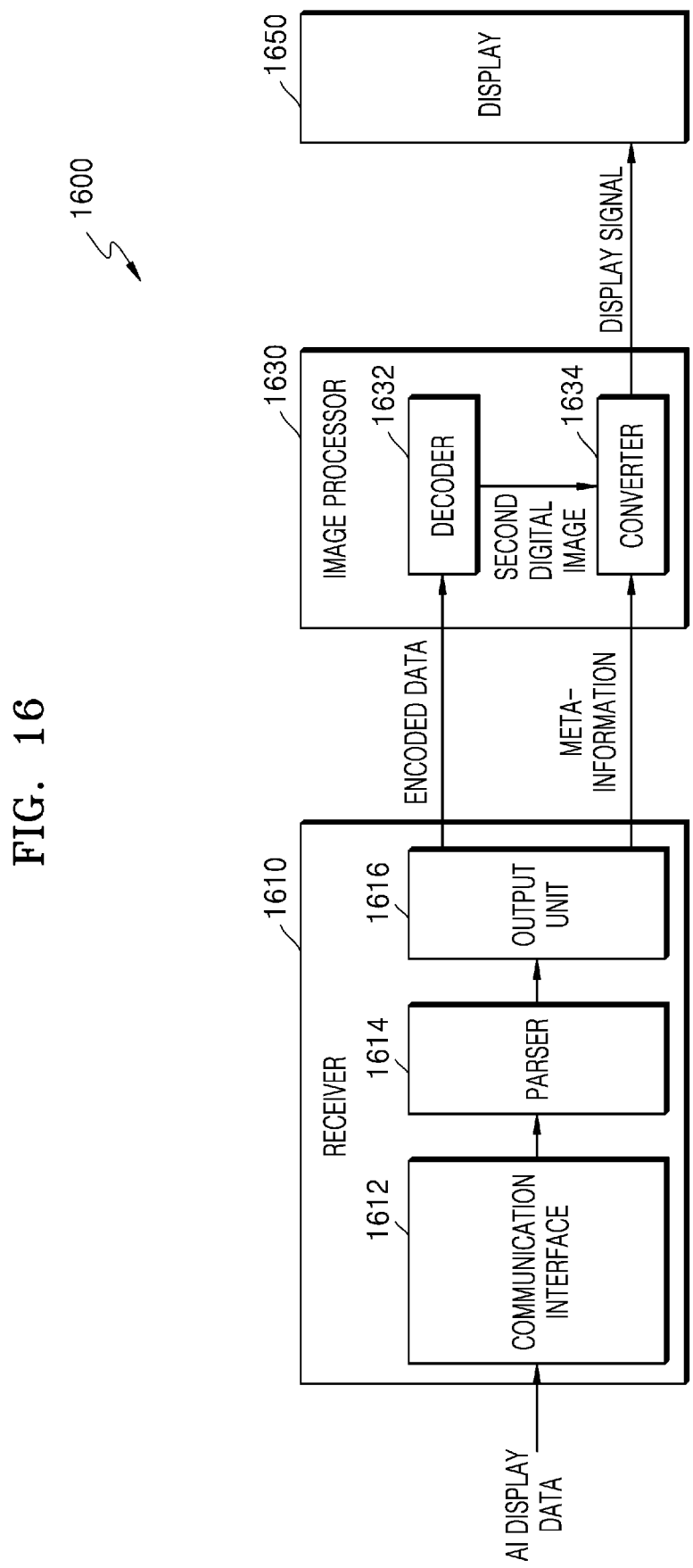
FIG. 16 is a block diagram of a display apparatus according to an embodiment.

FIG. 16 is a block diagram of the display apparatus 1600 according to an embodiment.

Referring to FIG. 16, the display apparatus 1600 according to an embodiment may include a receiver 1610, an image processor 1630, and a display 1650. The receiver 1610 may include a communication interface 1612, a parser 1614, and an output unit 1616, and the image processor 1630 may include a decoder 1632 and a converter 1634.

AI though FIG. 16 shows that the receiver 1610 is separated from the image processor 1630, the receiver 1610 and the image processor 1630 may be implemented by a single processor. In this case, the single processor may be implemented by an exclusive (or dedicated) processor or by a combination of a general-purpose processor, such as an AP, a CPU, or a GPU, and S/W. In addition, the exclusive processor may be implemented with a memory for implementing an embodiment or with a memory processor for using an external memory.

In addition, the receiver 1610 and the image processor 1630 may be implemented by a plurality of processors. In this case, the plurality of processors may be implemented by a combination of a plurality of general-purpose processors, such as an AP, a CPU, and a GPU, and S/W.

The display 1650 may include various types of displays capable of outputting a display signal, such as a liquid crystal display (LCD), a light emitting diode (LED) display, an organic light emitting diode (OLED) display, and a quantum dot light emitting diode (QLED) display.

AI though FIG. 16 shows that the display apparatus 1600 includes all of the receiver 1610, the image processor 1630, and the display 1650, according to implementation examples, the display apparatus 1600 may include only the receiver 1610 and the image processor 1630, and the display apparatus 1600 (e.g., image processing apparatus) may transmit a tone-mapped display signal to a separate display, The receiver 1610 receives and parses AI display data and separately transmits encoded data and meta-information to the image processor 1630.

In particular, the communication interface 1612 receives the AI display data through a network. The AI display data includes the encoded data and the meta-information. The meta-information includes OOTF meta-information and AI meta-information. The encoded data and the meta-information may be received through a homogeneous network or heterogeneous networks. At least one of the AI meta-information or the OOTF meta-information may be included in the encoded data. According to implementation examples, the communication interface 1612 may receive the meta-information from the image providing apparatus 200 and receive the encoded data from another device, e.g., a server. Alternatively, the communication interface 1612 may receive the AI meta-information from the image providing apparatus 200 and receive the encoded data and the OOTF meta-information from another device, e.g., a server.

According to an embodiment, the communication interface 1612 may transmit a transmission request message for a first digital image to the image providing apparatus 200 to receive the AI display data. In this case, the communication interface 1612 may also transmit performance information of the display apparatus 1600 to the image providing apparatus 200. The performance information of the display apparatus 1600 may include manufacturer information and model information of the display apparatus 1600.

The parser 1614 receives the AI display data received through the communication interface 1612 and parses the AI display data to separate the encoded data and the meta-information. For example, a header of data obtained by the communication interface 1612 is read to identify whether the data is the encoded data or the meta-information. Here, and by way of example, the parser 1614 separates the encoded data from the meta-information based on the header of the data received through the communication interface 1612 and transmits the encoded data and the meta-information to the output unit 1616, and the output unit 1616 transmits the encoded data and the meta-information to the decoder 1632 and the converter 1634, respectively. In this case, the parser 1614 may check which codec (e.g., MPEG-2, H.264, MPEG-4, HEVC, VC-1, VP8, VP9, AV1, etc.) is used to generate the encoded data. The parser 1614 may transmit corresponding information to the decoder 1632 through the output unit 1616, such that the encoded data is processed using the checked codec.

When both the AI meta-information and the OOTF meta-information are included in the encoded data, the parser 1614 may transmit the encoded data including the AI meta-information and the OOTF meta-information to the decoder 1632.

As shown in FIGS. 10 and 11, when the AI meta-information 1012 is included in the metadata box 1010, and the encoded data 1032 is included in the media data box 1030, the parser 1614 may extract the AI meta-information 1012 included in the metadata box 1010 and transmit the AI meta-information 1012 to the converter 1634, and extract the encoded data 1032 included in the media data box 1030 and transmit the encoded data 1032 to the decoder 1632. In particular, the parser 1614 extracts the AI_HDR_DNN_flag 1100, the AI_HDR_num_layers 1105, the AI_HDR_in_channel 1112, the AI_HDR_in_channel 1122, the AI_HDR_out_channel 1111, the AI_HDR_out_channel 1121, the AI_HDR_filter_size 1113, the AI_HDR_filter_size 1123, the AI_HDR_bias 1115, the AI_HDR_bias 1125, the AI_HDR_weights 1114, and the AI_HDR_weights 1124 and provides the AI_HDR_DNN_flag 1100, the AI_HDR_num_layers 1105, the AI_HDR_in_channel 1112, the AI_HDR_in_channel 1122, the AI_HDR_out_channel 1111, the AI_HDR_out_channel 1121, the AI_HDR_filter_size 1113, the AI_HDR_filter_size 1123, the AI_HDR_bias 1115, the AI_HDR_bias 1125, the AI_HDR_weights 1114, and the AI_HDR_weights 1124 to the converter 1634.

In addition, as shown in FIG. 12, when the AI meta-information 1234 is included in the encoded data 1232, the parser 1614 may extract the encoded data 1232 included in the media data box 1230 and transmit the encoded data 1232 to the decoder 1632.

According to an embodiment, the AI display data parsed by the parser 1614 may be obtained from data storage media including magnetic media such as hard disks, floppy disks, and magnetic tapes, optical recording media such as CD-ROMs and DVDs, magneto-optical media such as floptical disks, and the like.

The decoder 1632 restores a second digital image corresponding to the first digital image based on the encoded data. The decoder 1632 restores the second digital image according to a frequency transform-based image decompression scheme. The second digital image obtained by the decoder 1632 is provided to the converter 1634.

When the encoded data includes the AI meta-information and/or the OOTF meta-information, the decoder 1632 decodes the AI meta-information and/or the OOTF meta-information included in the encoded data and provides the decoded AI meta-information and/or OOTF meta-information to the converter 1634.

When the encoded data includes the AI meta-information, a method, performed by the decoder 1632, of parsing the AI meta-information may be performed, as described with reference to FIG. 13.

The decoder 1632 extracts the AI_HDR_DNN_flag 1301 included in the encoded data. The AI_HDR_DNN_flag 1301 indicates whether DNN-based tone mapping is necessary. When the AI_HDR_DNN_flag 1301 indicates that DNN-based tone mapping is not necessary, the decoder 1632 stops parsing the AI meta-information and provides, to the converter 1634, information indicating that DNN-based tone mapping is not necessary or not to be performed.

When the AI_HDR_DNN_flag 1301 indicates that DNN-based tone mapping is necessary, the decoder 1632 extracts the AI_HDR_num_layers 1303 from the encoded data. The AI_HDR_num_layers 1303 indicates the number of layers included in a DNN for tone mapping.

The decoder 1632 extracts the AI_HDR_in_channel[i] 1304, the AI_HDR_out_channel[i] 1305, the AI_HDR_filter_width[i] 1306, and the AI_HDR_filter_height[i] 1307 by as many as the number of layers included in the DNN. The AI_HDR_out_channel[i] 1305 indicates the number of channels of data output from an ith layer, and the AI_HDR_in_channel[i] 1304 indicates the number of channels of data input to the ith layer. In addition, the AI_HDR_filter_width[i] 1306 and the AI_HDR_filter_height[i] 1307 indicate a width and a height of a filter kernel used in the ith layer, respectively.

Thereafter, the decoder 1632 extracts the AI_HDR_bias[i][j] 1308 by as many as the number of output channels of the ith layer included in the DNN. The AI_HDR_bias[i][j] 1308 indicates a bias value to be added to or subtracted from a result value of a certain formula for output data of a jth channel of the ith layer.

The decoder 1632 extracts the AI_HDR_weight[i][j][k][l] 1309 by as many as the number of times corresponding to the number of input channels of the ith layer x the number of output channels of the ith layer x the width of the filter kernel used in the ith layer x the height of the filter kernel used in the ith layer. The AI_HDR_weight[i][j][k][l] 1309 indicates a weight of an lth sample in a filter kernel associated with the output data of the jth channel of the ith layer and input data of a kth channel.

The decoder 1632 provides the AI_HDR_in_channel[i] 1304, the AI_HDR_out_channel[ ] 1305, the AI_HDR_filter_width[i] 1306, the AI_HDR_filter_height[i] 1307, the AI_HDR_bias[i][j] 1308, and the AI_HDR_weight[i][j][k][l] 1309 extracted from the encoded data to the converter 1634 as the AI meta-information.

As described above, when the AI meta-information and/or the OOTF meta-information are included in an SEI message of the encoded data, the decoder 1632 may transmit the SEI message to the converter 1634, and the converter 1634 may obtain the AI meta-information and/or the OOTF meta-information from the SEI message. For example, size information of the SEI message may be stored in a header of the encoded data, and the decoder 1632 may check a size of the SEI message from the header, extract the SEI message of the checked size from the encoded data, and transmit the SEI message to the converter 1634.

An operation, performed by the converter 1634, of parsing the AI meta-information from the SEI message is the same as or similar to the operation, performed by the decoder 1632, of parsing the AI meta-information from the encoded data, and thus a redundant description thereof is omitted herein.

The converter 1634 sets an OOTF based on the meta-information, particularly, the OOTF meta-information, and sets an HDR DNN based on the AI meta-information. The OOTF may have a specification indicated by the OOTF meta-information, and the HDR DNN may have a specification indicated by the AI meta-information. In addition, the converter 1634 performs tone mapping on a second light signal corresponding to the second digital image by using the OOTF and the HDR DNN, thereby obtaining a display signal.

When the second digital image includes a plurality of frames, the converter 1634 may obtain pieces of AI meta-information corresponding to respective frames. In addition, the converter 1634 may independently set HDR DNNs for respective frames based on the pieces of AI meta-information. In this case, a specification of an HDR DNN set for any one frame may differ from a specification of an HDR DNN set for another frame.

Alternatively, when the second digital image includes a plurality of frames, the converter 1634 may obtain pieces of AI meta-information corresponding to respective frame groups. In addition, the converter 1634 may independently set HDR DNNs for respective frame groups based on the pieces of AI meta-information. In this case, a specification of an HDR DNN set for any one frame group may differ from a specification of an HDR DNN set for another frame group. AI meta-information corresponding to each frame group may include identification information (e.g., a picture order count or index number) of a frame to which the AI meta-information is applied. This may be useful when frames included in each group is not consecutive over time.

According to implementation examples, the converter 1634 may divide the frames included in the second digital image into a plurality of groups according to characteristics of the frames and set an HDR DNN for each group by using AI meta-information sequentially provided from the image providing apparatus 200. In this case, the AI meta-information may not include identification information of a frame to which the AI meta-information is applied, but the converter 1634 has to divide the frames into groups based on the same criterion as in the image providing apparatus 200.

When the second digital image includes a plurality of frames, the converter 1634 may obtain AI meta-information corresponding to the whole frames. In addition, the converter 1634 may set an HDR DNN for the whole frames based on the AI meta-information.

A tone mapping operation of the converter 1634 after setting the OOTF and the HDR DNN based on the OOTF meta-information and the AI meta-information is described below with reference to FIGS. 17 to 20.

Figure 17:
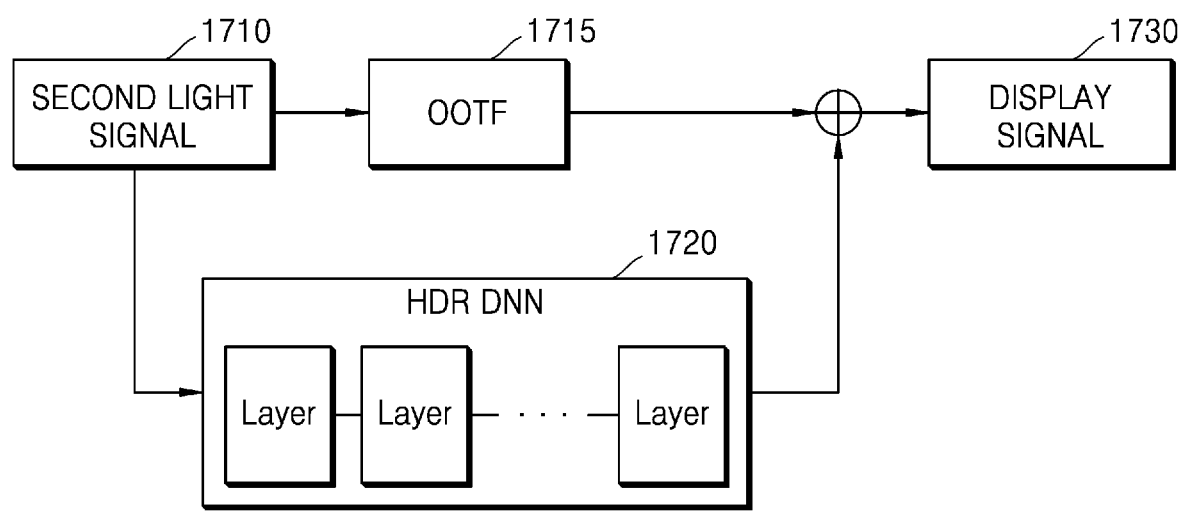
FIG. 17 illustrates a tone mapping operation performed by a display apparatus, according to an embodiment.

FIG. 17 illustrates a tone mapping operation performed by the display apparatus 1600, according to an embodiment.

Referring to FIG. 17, a second light signal 1710 corresponding to a second digital image is converted according to an OOTF 1715. Herein the OOTF 1715 is set based on OOTF meta-information. The second digital image is converted into the second light signal 1710 according to an EOTF.

The second light signal 1710 is processed by an HDR DNN 1720 set based on AI meta-information. A display signal 1730 is obtained by adding a result processed by the OOTF 1715 and an output result of the HDR DNN 1720.

Figure 18:
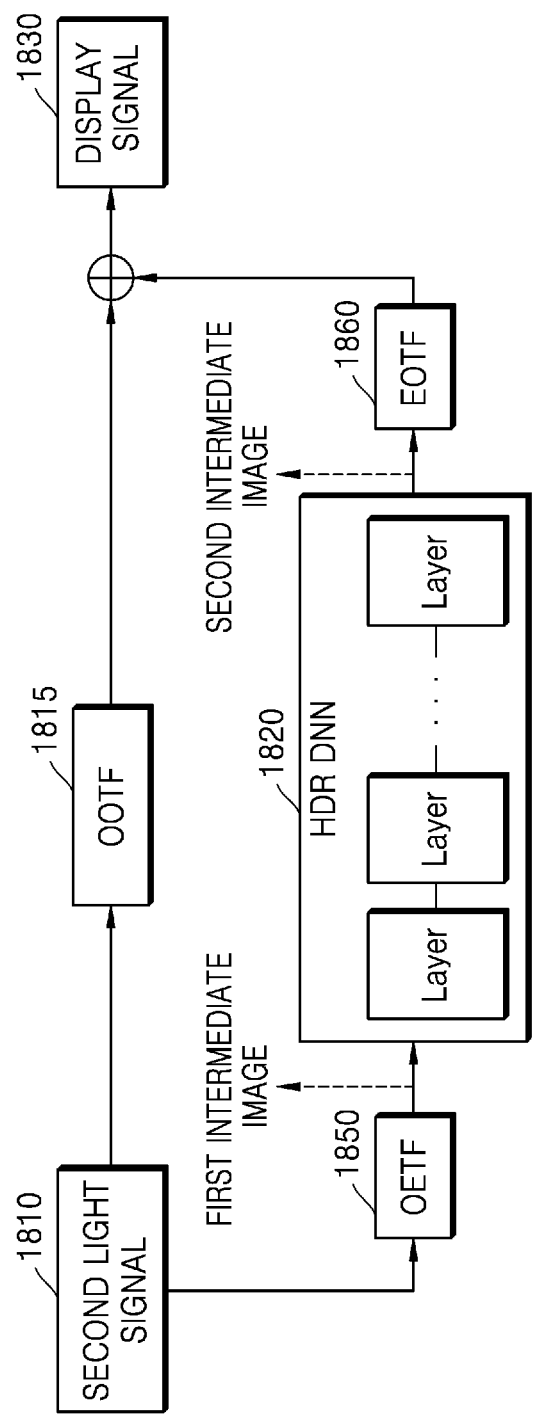
FIG. 18 illustrates a tone mapping operation performed by a display apparatus, according to another embodiment.

FIG. 18 illustrates a tone mapping operation performed by the display apparatus 1600, according to another embodiment.

Referring to FIG. 18, a second light signal 1810 corresponding to a second digital image is converted according to an OOTF 1815. The OOTF 1815 is set based on OOTF meta-information.

In addition, the second light signal 1810 is converted into a first intermediate image according to an OETF 1850. The first intermediate image is processed by an HDR DNN 1820 set based on AI meta-information. A second intermediate image is obtained as a processing result of the HDR DNN 1820. The first intermediate image may be the second digital image. In this case, a conversion operation by the OETF 1850 may be omitted, and the second digital image obtained in a decoding operation may be processed by the HDR DNN 1820.

The second intermediate image is converted into a light signal according to an EOTF 1860, and a display signal 1830 is obtained by adding a signal converted according to the EOTF 1860 and a signal converted according to the OOTF 1815.

Figure 19:
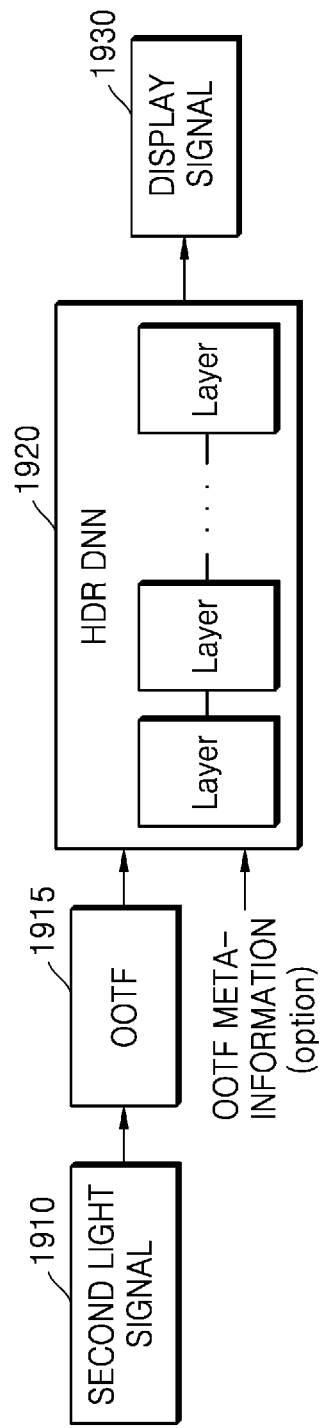
FIG. 19 illustrates a tone mapping operation performed by a display apparatus, according to another embodiment.

FIG. 19 illustrates a tone mapping operation performed by the display apparatus 1600, according to another embodiment.

Referring to FIG. 19, a second light signal 1910 corresponding to a second digital image is processed according to an OOTF 1915, and a light signal converted from the second light signal 1910 according to the OOTF 1915 is processed by an HDR DNN 1920 set based on AI meta-information, thereby obtaining a display signal 1930.

According to an embodiment, OOTF meta-information may also be input to the HDR DNN 1920. The OOTF meta-information is determined according to a characteristic of a first digital image corresponding to the second digital image, and thus, the HDR DNN 1920 may also consider the input OOTF meta-information to process the light signal.

Figure 20:
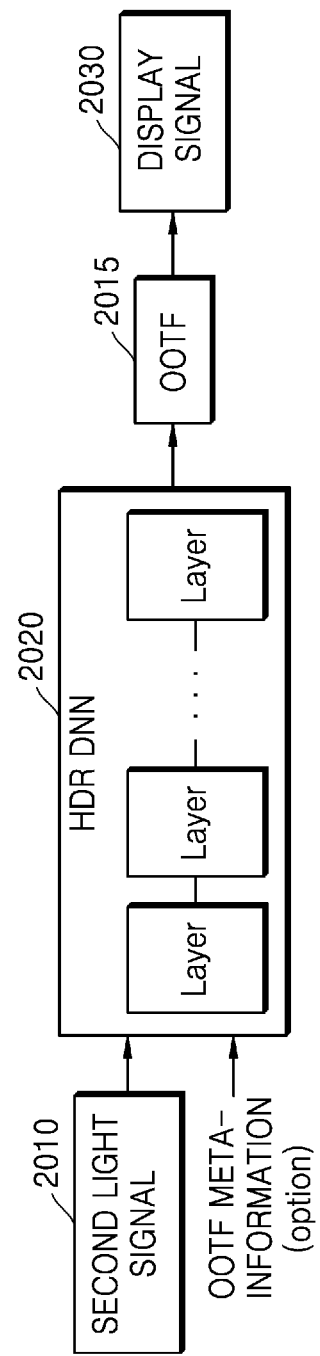
FIG. 20 illustrates a tone mapping operation performed by a display apparatus, according to another embodiment.

FIG. 20 illustrates a tone mapping operation performed by the display apparatus 1600, according to another embodiment.

Referring to FIG. 20, a second light signal 2010 corresponding to a second digital image is processed by an HDR DNN 2020 set based on AI meta-information. OOTF meta-information may also be input to the HDR DNN 2020 when the second light signal 2010 is input to the HDR DNN 2020. A signal output from the HDR DNN 2020 is processed according to an OOTF 2015, and a display signal 2030 is obtained as the processing result.

Figure 21:
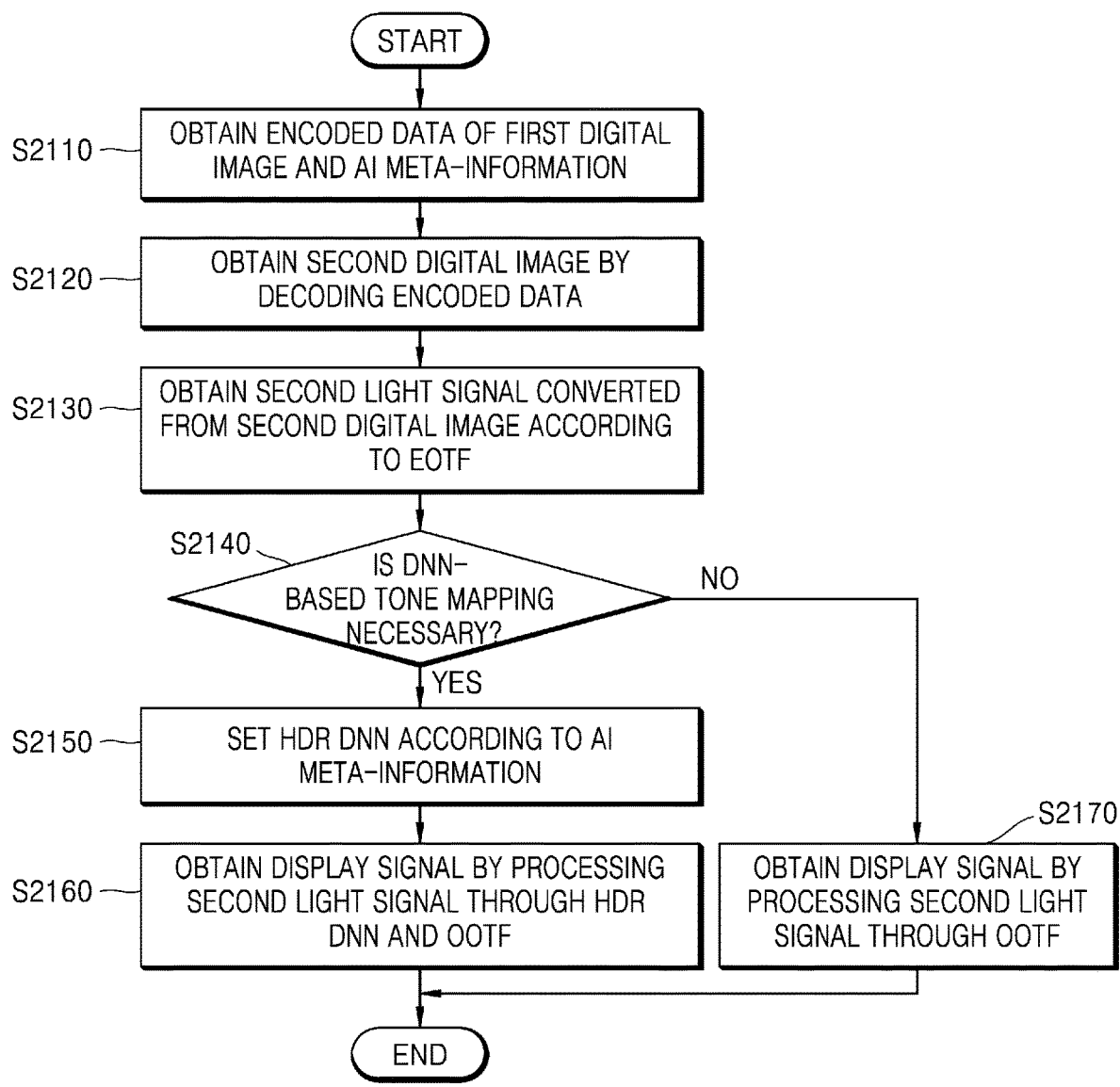
FIG. 21 is a flowchart of a display method according to an embodiment.

FIG. 21 is a flowchart of a display method according to an embodiment.

Referring to FIG. 21, in operation S2110, the display apparatus 1600 obtains encoded data of a first digital image and AI meta-information. The display apparatus 1600 may further obtain OOTF meta-information.

In operation S2120, the display apparatus 1600 obtains a second digital image by decoding the encoded data. When the AI meta-information is included in the encoded data, the display apparatus 1600 may obtain the AI meta-information by decoding the encoded data.

In operation S2130, the display apparatus 1600 obtains a second light signal converted from the second digital image according to an EOTF.

In operation S2140, the display apparatus 1600 determines whether DNN-based tone mapping processing is necessary, based on the AI meta-information.

In operation S2150, when it is determined that DNN-based tone mapping processing is necessary, the display apparatus 1600 sets an HDR DNN for tone mapping based on the AI meta-information. According to an embodiment, when the AI meta-information is obtained in a unit of individual frames included in the second digital image, the display apparatus 1600 may set an HDR DNN for tone mapping, for each frame. Alternatively, when the AI meta-information is obtained in a unit of frame groups included in the second digital image, the display apparatus 1600 may set an HDR DNN for tone mapping, for each group. Alternatively, when the AI meta-information is obtained in a unit of all frames included in the second digital image, the display apparatus 1600 may set a single HDR DNN for tone mapping.

In operation S2160, the display apparatus 1600 obtains a display signal by processing the second light signal obtained in operation S2130, through an OOTF set based on the OOTF meta-information and the HDR DNN set based on the AI meta-information. The display signal is output as an image on the display 1650.

In operation S2170, when it is determined that DNN-based tone mapping processing is not necessary, the display apparatus 1600 obtains a display signal by processing the second light signal through an OOTF set based on the OOTF meta-information. The display signal is output as an image on the display 1650.

Figure 22:
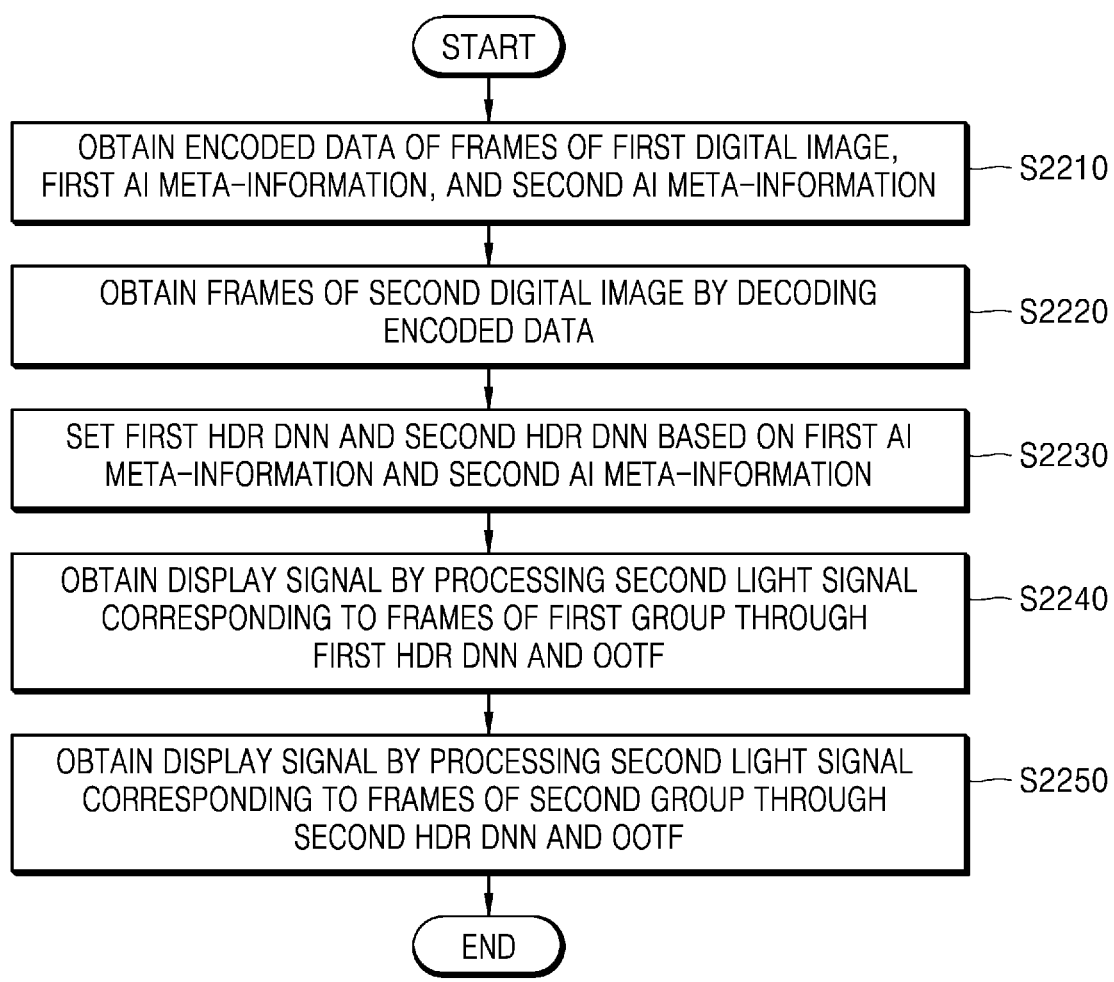
FIG. 22 is a flowchart of a display method according to another embodiment.

FIG. 22 is a flowchart of a display method according to another embodiment.

Referring to FIG. 22, in operation S2210, the display apparatus 1600 obtains encoded data of frames of a first digital image, first AI meta-information, and second AI meta-information.

In operation S2220, the display apparatus 1600 obtains frames of a second digital image by decoding the encoded data.

In operation S2230, the display apparatus 1600 sets a first HDR DNN based on the first AI meta-information and sets a second HDR DNN based on the second AI meta-information.

In operation S2240, the display apparatus 1600 obtains a display signal by processing a second light signal corresponding to frames of a first group among the frames of the second digital image through a first HDR DNN and an OOTF. Further, in operation S2250, the display apparatus 1600 obtains a display signal by processing a second light signal corresponding to frames of a second group among the frames of the second digital image through a second HDR DNN and the OOTF.

The first AI meta-information and the second AI meta-information may include identification numbers of frames to which the first AI meta-information and the second AI meta-information are applied, respectively. When frames included in each group are consecutive over time, the first AI meta-information and the second AI meta-information may include identification numbers of a first frame and a last frame to which the first AI meta-information and the second AI meta-information are applied, respectively.

The display signal corresponding to the frames of the first group and the display signal corresponding to the frames of the second group are displayed as an image on the display 1650.

The process shown in FIG. 22 is performed by considering when the first AI meta-information and the second AI meta-information are included in the metadata box 1010 by being separated from the encoded data 1032 as shown in FIG. 10. When the first AI meta-information and the second AI meta-information are included in the encoded data 1232 as shown in FIG. 12, the first AI meta-information and the second AI meta-information are obtained through the decoding in operation S2220.

The above-described embodiments may be written or implemented as a computer-executable program or code, and the program or code may be stored in a medium.

The medium may continuously store the computer-executable program or temporarily store the computer-executable program for execution or downloading. In addition, the medium may include various recording means or storage means in a form of single or combination of several pieces of hardware, and the medium is not limited to a medium directly connected to a certain computer system but may be distributed over a network. Examples of the medium may include magnetic media such as hard disks, floppy disks, and magnetic tapes, optical recording media such as CD-ROMs, and DVDs, magneto-optical media such as floptical disks, ROMs, RAMs, and flash memories that are configured to store program instructions. In addition, examples of other media may include application stores for distributing applications, other sites for supplying or distributing various kinds of S/W, and recording media and storage media managed by a server and the like.

An image providing apparatus and an image providing method therefor, and a display apparatus and a display method therefor according to an embodiment may improve quality of an image to be displayed, through AI-based tone mapping.

However, effects achieved by the image providing apparatus and the image providing method therefor, and the display apparatus and the display method therefor according to an embodiment are not limited to the above description, and other effects which are not described could be clearly understood by those of ordinary skill in the art to which the disclosure belongs.

While the technical idea of the disclosure has been described in detail with reference to embodiments, the technical idea of the disclosure is not limited to the embodiments described above and could be variously modified and changed by those of ordinary skill in the art within the scope of the technical idea of the disclosure.

What is claimed is:

1. A display apparatus comprising:
a memory storing one or more instructions; and
a processor configured to execute the stored one or more instructions to:
obtain encoded data of a first digital image and artificial intelligence (AI) meta-information indicating a specification of a deep neural network (DNN),
obtain, by decoding the encoded data, a second digital image corresponding to the first digital image,
obtain a light signal converted from the second digital image according to a predetermined electro-optical transfer function (EOTF),
process the light signal by using an opto-optical transfer function (OOTF),
process the light signal by using a high dynamic range (HDR) DNN, the HDR DNN having the specification of the DNN indicated by the AI meta-information, and
obtain a display signal by adding a signal converted from the light signal according to the OOTF and an output signal of the HDR DNN.

2. The display apparatus of claim 1, wherein:
the HDR DNN comprises a plurality of layers; and
the AI meta-information comprises at least one of a number of layers, a type of the layers, a number of filter kernels used in at least one layer, a size of a filter kernel used in the at least one layer, a weight of the filter kernel used in the at least one layer, or a bias value.

3. The display apparatus of claim 1, wherein:
the second digital image comprises a plurality of frames; and
the processor is further configured to execute the stored one or more instructions to:
obtain first AI meta-information for a frame in a first group and second AI meta-information for a frame in a second group among the plurality of frames, and
independently set an HDR DNN for the frame in the first group, according to the first AI meta-information, and an HDR DNN for the frame in the second group, according to the second AI meta-information.

4. The display apparatus of claim 3, wherein:
the first AI meta-information comprises first identification information of frames to which the first AI meta-information is applied; and
the second AI meta-information comprises second identification information of frames to which the second AI meta-information is applied.

5. An image providing apparatus comprising:
a memory storing one or more instructions; and
a processor configured to execute the stored one or more instructions to:
process a light signal corresponding to a first digital image by using an opto-optical transfer function (OOTF),
process the light signal by using a high dynamic range (HDR) DNN, the HDR DNN having a predetermined specification,
obtain a display signal by adding a signal converted from the light signal according to the OOTF and an output signal of the HDR DNN,
determine a specification of a deep neural network (DNN) based on difference information between a ground truth signal and the display signal,
encode the first digital image, and
transmit, to a display apparatus, encoded data of the first digital image and artificial intelligence (AI) meta-information indicating the determined specification of the DNN.

6. The image providing apparatus of claim 5, wherein the ground truth signal is predetermined based on a signal converted from the light signal according to the OOTF.

7. The image providing apparatus of claim 5, wherein:
the first digital image comprises a plurality of frames; and
the processor is further configured to execute the stored one or more instructions to independently determine a first specification of a DNN for a frame in a first group and a second specification of a DNN for a frame in a second group, among the plurality of frames.

8. The image providing apparatus of claim 7, wherein the processor is further configured to execute the stored one or more instructions to divide the plurality of frames into frames in the first group and frames in the second group based on a histogram similarity or a variance of pixel values of each of the plurality of frames.

9. The image providing apparatus of claim 7, wherein the processor is further configured to execute the stored one or more instructions to:
determine a representative frame in the first group and a representative frame in the second group, among the plurality of frames,
determine the first specification of the DNN based on difference information between the ground truth signal and a result of processing, by using the OOTF and the DNN, a light signal corresponding to the representative frame in the first group, and
determine the second specification of the DNN based on difference information between the ground truth signal and a result of processing, by the OOTF and the DNN, a light signal corresponding to the representative frame in the second group.

10. The image providing apparatus of claim 5, wherein the processor is further configured to execute the stored one or more instructions to transmit, to the display apparatus, information indicating whether DNN-based tone mapping processing is necessary, according to a value of brightness that the display apparatus is able to display.

11. The image providing apparatus of claim 10, wherein the processor is further configured to execute the stored one or more instructions to transmit, to the display apparatus, information indicating that the DNN-based tone mapping processing is not necessary, based on a difference between a maximum value of the brightness that the display apparatus is able to display and a threshold brightness value being less than or equal to a predetermined value.

12. The image providing apparatus of claim 5, wherein the processor is further configured to execute the stored one or more instructions to:
receive performance information from the display apparatus;
determine one of specifications of a plurality of DNNs usable for tone mapping of the light signal corresponding to the first digital image based on the received performance information; and
transmit AI meta-information indicating the determined one specification of the DNN to the display apparatus.

13. The image providing apparatus of claim 5, wherein:
the processor is further configured to execute the stored one or more instructions to determine restrictive conditions of the DNN based on pixel values of the first digital image; and the restrictive conditions include at least one of a minimum number of layers included in the DNN, a minimum size of a filter kernel used in at least one layer, or a minimum number of filter kernels used in the at least one layer.

14. A method, performed by a display apparatus, of displaying an image, the method comprising:

obtaining encoded data of a first digital image and artificial intelligence (AI) meta-information indicating a specification of a deep neural network (DNN);

obtaining, by decoding the encoded data, a second digital image corresponding to the first digital image;

obtaining a light signal converted from the second digital image according to a predetermined electro-optical transfer function (EOTF);

processing the light signal by using an opto-optical transfer function (OOTF);

processing the light signal by using a high dynamic range (HDR) DNN, the HDR DNN having the specification of the DNN indicated by the AI meta-information; and obtaining a display signal by adding a signal converted from the light signal according to the OOTF and an output signal of the HDR DNN.

15. A non-transitory computer-readable recording medium having stored therein a computer-readable program for executing the image display method, the image display method comprising:

obtaining encoded data of a first digital image and artificial intelligence (AI) meta-information indicating a specification of a deep neural network (DNN);

obtaining, by decoding the encoded data, a second digital image corresponding to the first digital image;

obtaining a light signal converted from the second digital image according to a predetermined electro-optical transfer function (EOTF);

processing the light signal by using an opto-optical transfer function (OOTF);

processing the light signal by using a high dynamic range (HDR) DNN, the HDR DNN having the specification of the DNN indicated by the AI meta-information; and obtaining a display signal by adding a signal converted from the light signal according to the OOTF and an output signal of the HDR DNN.

* * * * *